US008836690B2

(12) United States Patent
Minami et al.

(10) Patent No.: US 8,836,690 B2
(45) Date of Patent: Sep. 16, 2014

(54) DISPLAY APPARATUS AND DRIVE METHOD THEREOF AND ELECTRONIC DEVICE

(75) Inventors: Tetsuo Minami, Tokyo (JP); Masatsugu Tomida, Kanagawa (JP); Yukihito Iida, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 1100 days.

(21) Appl. No.: 12/076,156

(22) Filed: Mar. 14, 2008

(65) Prior Publication Data

US 2008/0231625 A1 Sep. 25, 2008

(30) Foreign Application Priority Data

Mar. 22, 2007 (JP) ................................ 2007-074985

(51) Int. Cl.

| | |
|---|---|
| ***G06F 3/038*** | (2013.01) |
| ***G09G 5/00*** | (2006.01) |
| ***G09G 3/32*** | (2006.01) |

(52) U.S. Cl.

CPC ...... *G09G 3/3233* (2013.01); *G09G 2310/0256* (2013.01); *G09G 2310/0297* (2013.01); *G09G 2300/0819* (2013.01); *G09G 2300/0842* (2013.01)

USPC .............. 345/212; 345/76; 345/204; 345/214

(58) Field of Classification Search

None

See application file for complete search history.

(56) References Cited

U.S. PATENT DOCUMENTS

| | | | | |
|---|---|---|---|---|
| 6,727,878 | B2 * | 4/2004 | Okuzono et al. | 345/96 |
| 2003/0043131 | A1 * | 3/2003 | Iguchi | 345/204 |
| 2005/0007357 | A1 * | 1/2005 | Yamashita et al. | 345/204 |
| 2006/0170628 | A1 * | 8/2006 | Yamashita et al. | 345/76 |

FOREIGN PATENT DOCUMENTS

| | | |
|---|---|---|
| JP | 2003-255856 | 9/2003 |
| JP | 2003-271095 | 9/2003 |
| JP | 2004-029791 | 1/2004 |
| JP | 2004-093682 | 3/2004 |
| JP | 2004-133240 | 4/2004 |

* cited by examiner

*Primary Examiner* — Jesus Hernandez

(74) *Attorney, Agent, or Firm* — Rader, Fishman & Grauer PLLC

(57) ABSTRACT

Disclosed herein is a display apparatus including a pixel array section and a drive section. The pixel array section has power supply lines, scan lines arranged in row, signal lines arranged in column, and pixels arranged in matrix at intersections of each of the scan lines and each of the signal lines. The drive transistor is connected at one of a pair of current terminals to the light emitting device and at the other of the pair of current terminals to the power supply line. The drive section supplies a control signal to each scan line and a video signal to each signal line to drive each pixel, executing a threshold voltage correcting operation, a write operation, and a light emitting operation.

14 Claims, 18 Drawing Sheets

3

DISPLAY APPARATUS AND DRIVE METHOD THEREOF AND ELECTRONIC DEVICE

CROSS REFERENCES TO RELATED APPLICATIONS

The present invention contains subject matter related to Japanese Patent Application JP 2007-074985 filed in the Japan Patent Office on Mar. 22, 2007, the entire contents of which being incorporated herein by reference.

BACKGROUND OF THE INVENTION

1. Filed of the Invention

The present invention relates to a display apparatus of active matrix type based on light emitting devices used as pixels and the drive method thereof. The present invention also relates to an electronic device based on this display apparatus.

2. Description of the Related Art

Recently, planar self-luminous display apparatuses based on organic EL (ElectroLuminescence) devices have been increasingly under development. The organic EL device is a light emitting device based on a phenomenon in which light is emitted when an electric field is impressed upon an organic thin film. The organic EL device can be driven on less than 10 V of applied voltage, so that this device involves low power dissipation. In addition, the organic EL device is self-luminous, so that no lighting member is required, thereby making this device light in weight and low in profile. Further, the response speed of the organic EL device is as fast as several microseconds, thereby suppressing the generation of afterimage at displaying a moving image.

Of the planar self-luminous display apparatuses based on organic EL devices, most active is the development of active matrix display apparatuses with a thin-film transistor integratedly formed on each pixel. Active matrix planar self-luminous display apparatuses are disclosed in Japanese Patent Laid-Open No. 2003-255856, Japanese Patent Laid-Open No. 2003-271095, Japanese Patent Laid-Open No. 2004-133240, Japanese Patent Laid-Open No. 2004-029791, and Japanese Patent Laid-Open No. 2004-093682, for example (referred to as Patent Documents 1 to 5 hereinafter).

SUMMARY OF THE INVENTION

However, related-art active matrix planar self-luminous display apparatuses involve a problem of causing the threshold voltage of the transistor for driving light emitting devices to fluctuate due to process variation. This characteristic fluctuation adversely affects light emitting luminance. Therefore, in order to uniformly control the light emitting luminance over the entire screen of the display apparatus, it is required to correct the threshold voltage fluctuation of the above-mentioned drive transistor in each pixel circuit. A display apparatus having such a threshold voltage correction capability for each pixel has been proposed.

With related-art pixel circuits, a video signal with the threshold voltage corrected is sampled and the light emitting device is driven on the basis of the sampling. However, a current leak occurs on the drive transistor between the threshold voltage correcting operation and the light emitting operation, which causes the threshold voltage correction to be not necessarily executed correctly, thereby involving an error. This error or fluctuation of the threshold voltage correction causes the unevenness in light emitting luminance, which in turn causes impaired picture quality.

Therefore, the present invention addresses the above-identified and other problems associated with related-art methods and apparatuses and solves the addressed problems by providing a display apparatus improved in the accuracy of a threshold voltage correcting operation by suppressing a current leak of a drive transistor to minimize the fluctuation of light emitting luminance. In carrying out the invention and according to a first embodiment thereof, there is provided a display apparatus. This display apparatus is made up of a pixel array section and a drive section, the pixel array section having power supply lines, scan lines arranged in row, signal lines arranged in column, and pixels arranged in matrix at intersections of each of the scan lines and each of the signal lines, each of the pixels at least having a sampling transistor, a drive transistor, a light emitting device, and a capacitor. The sampling transistor is connected at a control terminal thereof to the scan line and at one of a pair of current terminals of the sampling transistor to the scan line and at the other of the pair of current terminals to a control terminal of the drive transistor. The drive transistor is connected at one of a pair of current terminals to the light emitting device and at the other of the pair of current terminals to the power supply line. The drive section supplies a control signal to each scan line and a video signal to each signal line to drive each pixel, thereby executing a threshold voltage correcting operation for correcting a fluctuation of a threshold voltage of the drive transistor, a write operation for writing the video signal to the capacitor, and a light emitting operation for driving the light emitting device in accordance with the written video signal. The threshold voltage correcting operation has a preparation process in which, while the control terminal that is a gate of the drive transistor is maintained at a reference potential, a gate-to-source voltage with the current terminal that is a source of the drive transistor is set higher than the threshold voltage to turn on the drive transistor, an energizing process in which the drive transistor is energized with the gate maintained at the reference potential to hold, in the capacitor, a voltage equivalent to the threshold voltage appearing between the gate and the source when the drive transistor is cut off, and a compression process in which the reference potential applied to the gate is varied to compress the gate-to-source voltage to higher level than the voltage equivalent to the threshold voltage to surely turn off the drive transistor.

In the above-mention first embodiment of the invention, the drive section has a write scanner for sequentially supplying control signals to scan lines for each horizontal scan period, a power supply scanner for switching each power supply line between high potential and low potential, and a signal driver for supplying a video signal in which a signal potential and a reference potential are switched in each horizontal scan period to each signal line. In the preparation period, while the write scanner outputs a control signal to turn on the sampling transistor and samples the reference potential from the signal line to apply the sampled reference potential to the gate of the drive transistor, the power supply scanner switches the power supply line from high potential to low potential to lower a potential of the source of the drive transistor to low potential. In the energizing process, the power supply scanner switches the power supply line from low potential to high potential to energize the drive transistor until the drive transistor cuts off. In the compression process, the signal driver switches a level of the reference potential downward immediately before the write scanner clears the control signal to turn off the sampling transistor while the power supply scanner maintains the power supply line at high potential.

In carrying out the invention and according to a second embodiment thereof, there is provided a display apparatus. This display apparatus is made up of a pixel array section and a drive section. The pixel array section has power supply lines, scan lines arranged in row, signal lines arranged in column, and pixels arranged in matrix at intersections of each of the scan lines and each of the signal lines. Each of the pixels at least has a sampling transistor, a drive transistor, a light emitting device, and a capacitor. The sampling transistor is connected at a control terminal thereof to the scan line and at one of a pair of current terminals of the sampling transistor to the scan line and at the other of the pair of current terminals to a control terminal of the drive transistor. The drive transistor is connected at one of a pair of current terminals to the light emitting device and at the other of the pair of current terminals to the power supply line. The drive section supplies a control signal to each scan line and a video signal to each signal line to drive each pixel, thereby executing a threshold voltage correcting operation for correcting a fluctuation of a threshold voltage of the drive transistor, a write operation for writing the video signal to the capacitor, and a light emitting operation for emitting the light emitting device in accordance with the written video signal. The threshold voltage correcting operation has a preparation process in which, while the control terminal that is a gate of the drive transistor is maintained at a reference potential, a gate-to-source voltage with the current terminal that is a source of the drive transistor is set higher than the threshold voltage to turn on the drive transistor and an energizing process in which the drive transistor is energized with the gate maintained at the reference potential to hold, in the capacitor, a voltage equivalent to the threshold voltage appearing between the gate and the source when the drive transistor is cut off. The energizing process is executed in a time division manner a plurality of times until the drive transistor cuts off, there being a difference between a reference potential to be applied to the gate of the drive transistor in a preceding energizing process and a reference potential to be applied to the gate of the drive transistor in a following energizing process.

Preferably, the energizing process is executed in a time division manner a plurality of times until the drive transistor cuts off and the reference potential to be applied to the gate of the drive transistor in the following energizing process becomes higher than the reference potential to be applied to the gate of the drive transistor in the preceding energizing process. The drive section has a write scanner for sequentially supplying control signals to scan lines for each horizontal scan period, a power supply scanner for switching each power supply line between high potential and low potential, and a signal driver for supplying a video signal in which a signal potential and a reference potential are switched in each horizontal scan period to each signal line; in the preparation period, while the write scanner outputs a control signal to turn on the sampling transistor and samples the reference potential from the signal line to apply the sampled reference potential to the gate of the drive transistor, the power supply scanner switches the power supply line from low potential to high potential to lower a potential of the source of the drive transistor to low potential; and in the energizing process, the power supply scanner switches the power supply line from high potential to low potential to energize the drive transistor until the drive transistor cuts off. The signal driver executes switching control such that the reference potential to be outputted to the signal line in the following energizing processing is higher than the reference potential to be outputted to the signal line in the preceding energizing process.

With the display apparatus according to the present embodiment, each pixel executes a drive transistor threshold voltage correcting operation before executing a video signal write operation and a light emitting device lighting operation. This threshold voltage correcting operation includes a preparation process and an energizing process. In the preparation process, while the gate of the drive transistor is maintained at the reference potential, the gate-to-source voltage of the drive transistor is set higher than the threshold voltage to turn on the drive transistor. In the following energizing process, the drive transistor is energized with the gate maintained at the reference potential and, when the drive transistor cuts off, a voltage equivalent to the threshold voltage appearing between gate and source is held in the capacitor.

According to the first embodiment of the invention, the threshold voltage correcting operation has a compression process after the above-mentioned preparation process and energizing process. In the compression process, the reference potential applied to the gate after the energizing process is varied to compress the gate-to-source voltage higher than the voltage equivalent to the threshold voltage, thereby surely turning off the drive transistor. This configuration prevents a leak current from flowing in the drive transistor, thereby stably maintaining results of the threshold voltage correcting operation until later write and light emitting operations. In other words, the fluctuation of the threshold voltage correcting operation is minimized to significantly enhance the accuracy. Consequently, the light emitting luminance has little fluctuation to significantly enhance the quality of screen.

According to the second embodiment of the invention, the energizing process of the threshold voltage correcting operation is executed in a time division manner a plurality of times until the drive transistor is cut off. This configuration can give a sufficient energizing time, thereby surely allocating a voltage equivalent to the threshold voltage into the capacitor. In doing so, a difference is provided in the reference voltage level to be applied to the gate of the drive transistor between the preceding energizing process and the following energizing process. To be more specific, the reference voltage to be applied to the gate of the drive transistor in the following energizing process is set higher than that in the preceding energizing process. Thus, switching between the reference voltage levels in the energizing process executed in a time division manner can suppress the current leak of the drive transistor, eventually stabilizing the threshold voltage correcting operation and enhancing the accuracy thereof. Consequently, the fluctuation of the light emitting luminance of each pixel is minimized to improve the uniformity of screen.

DETAILED DESCRIPTION OF THE PREFERRED EMBODIMENTS

Figure 1:
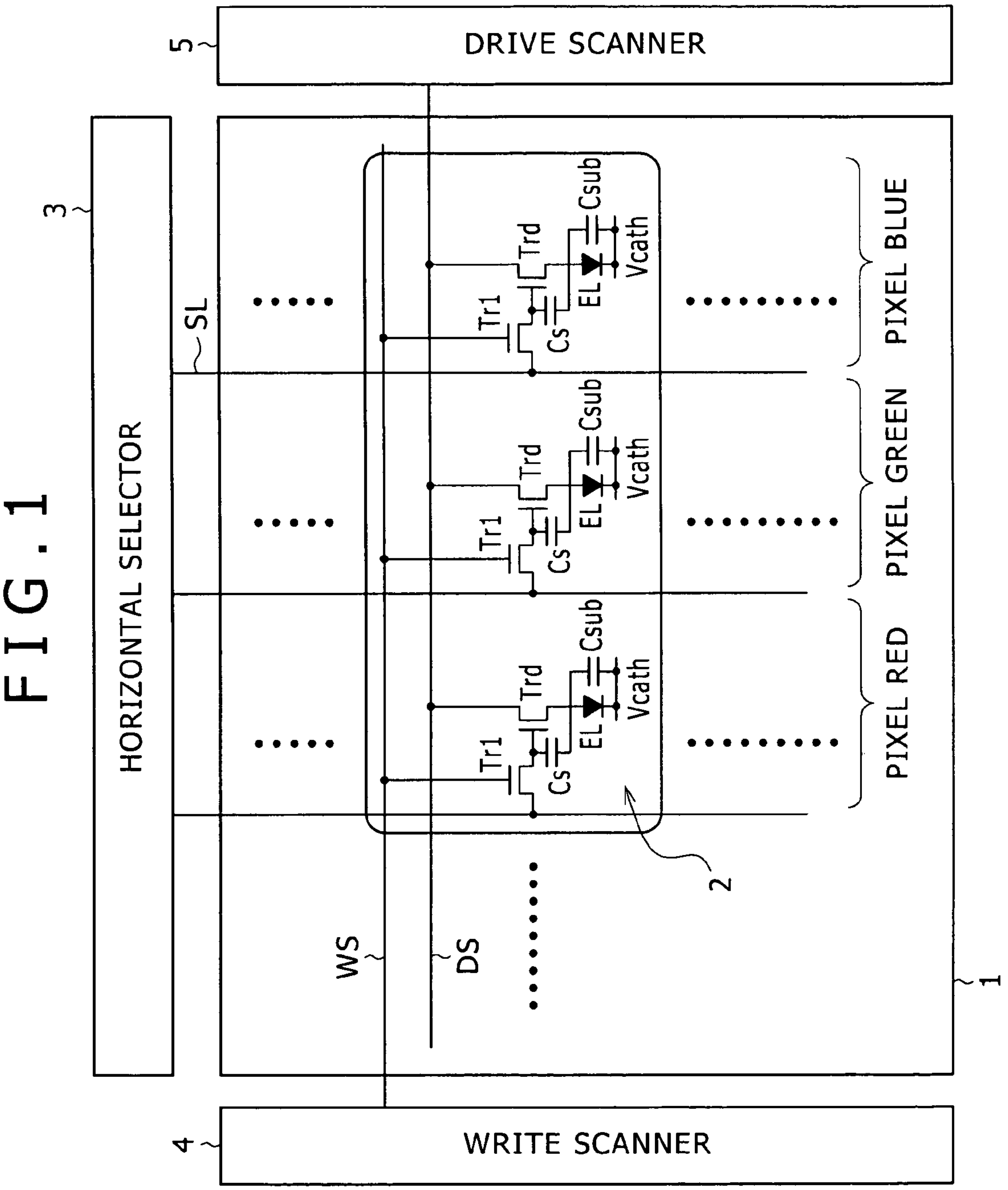
FIG. 1 is a block diagram illustrating an overall configuration of a display apparatus practiced as one embodiment of the invention.

This invention will be described in further detail by way of embodiments thereof with reference to the accompanying drawings. Now, referring to FIG. 1, there is shown an overall configuration of a display apparatus practiced as one embodiment of the invention. As shown, the display apparatus is made up of a pixel array block 1 and a drive block configured to drive the pixel array block 1. The pixel array block 1 has write scan lines WS arranged in row, signal lines SL arranged in column, pixels 2 each arranged in row at each intersection between the write scan line WS and the signal lines SL, and power supply lines DS each arranged for each row of pixels 2. The drive block has a write scanner 4 for sequentially supplying control signals to the write scan lines to sequentially scanning pixels 2 on a row basis, a drive scanner 5 for supplying a supply voltage switching between high and low potentials for each power supply line DS in synchronization with this line sequential scan, and a horizontal selector 3 for supplying a signal potential providing a video signal and a reference potential to each of signal lines SL arranged in column in synchronization with this line sequential scan. The write scanner 4 and the drive scanner 5 make up a scanner block and the horizontal selector 3 makes up a signal driver.

Each pixel 2 is made up of a sampling transistor Tr1, a drive transistor Trd, a storage capacitor (Cs), a sub capacitor (Csub), and a light emitting device EL. Each light emitting device EL is designed to emit light in one of three primary colors RGB. A pixel trio is made up of a pixel (RED) having a red light emitting device, a pixel (GREEN) having a green light emitting device, and a pixel (BLUE) having a blue light emitting device. Arranging pixel trios on the pixel array block 1 in a matrix allows color display.

Figure 2:
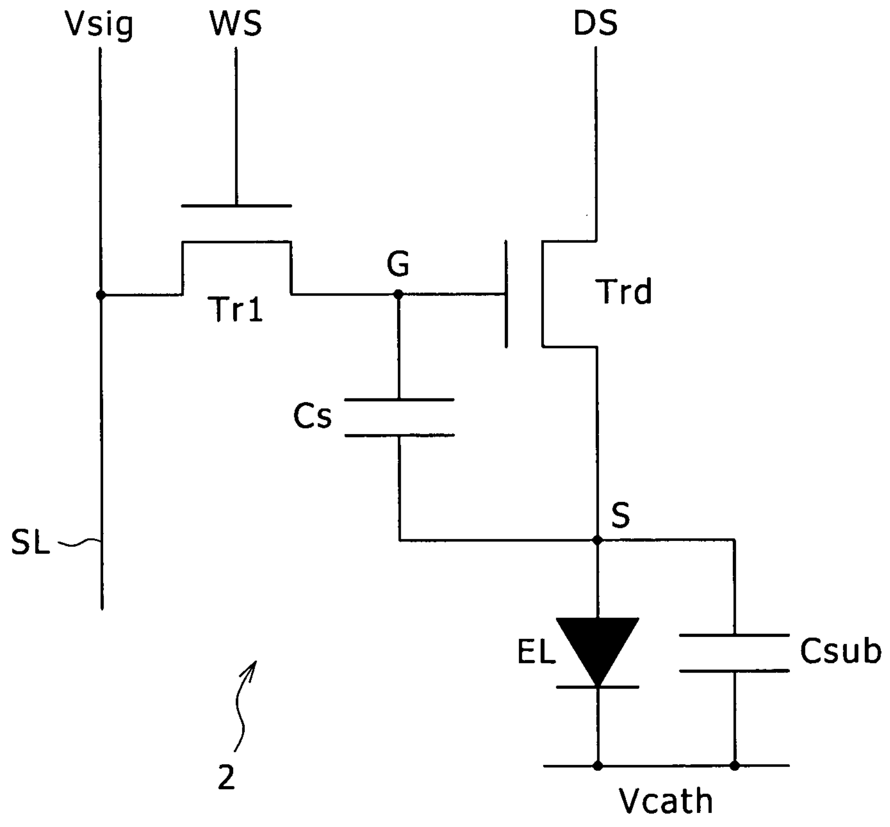
FIG. 2 is a circuit diagram illustrating an exemplary configuration of a pixel included in the display apparatus shown in FIG. 1.

FIG. 2 shows a specific configuration of the pixel 2 included in the display apparatus shown in FIG. 1 and a line connection relationship of the pixel 2. As shown, this pixel 2 includes a light emitting device EL represented by an organic EL device for example, a sampling transistor Tr1, a drive transistor Trd, and a storage capacitor Cs. The sampling transistor Tr1 is connected at a gate thereof to the write scan line WS, at one of the source and drain thereof to a corresponding signal line SL, and at the other of the source and drain thereof to a gate G of the drive transistor Trd. The drive transistor Trd is connected at a source S thereof to the light emitting device EL, and at a drain thereof to a corresponding power supply line DS. A cathode of the light emitting device EL is connected to a ground potential Vcath. This ground wiring is common to all pixels 2. The storage capacitor (or a pixel capacitor) Cs is connected between the source S and the gate G of the drive transistor Trd. In addition, the sub capacitor Csub is connected in parallel to the light emitting device EL. This sub capacitor Csub, added as required, has a function of increasing an input gain of a video signal Vsig for the storage capacitor Cs.

The pixel configuration shown in FIG. 2 is illustrative only and therefore the present invention is not restricted to this configuration. Basically, each pixel 2 includes at least a sampling transistor Tr1, a drive transistor Trd, a light emitting device EL, and a storage capacitor Cs. The sampling transistor Tr1 is connected at a control terminal (or a gate) thereof to the write scan line WS and at a pair of current terminals (source and drain) thereof connected between the signal line SL and the control terminal of the drive transistor Trd. The drive transistor Trd is connected at one of the pair of current terminals (source and drain) to the light emitting device EL and at the other of the pair to the power supply line DS. The storage capacitor Cs is connected between the control terminal (gate G) of the drive transistor Trd and one (source S) of a pair of current terminals (source and drain) of the drive transistor Trd.

Figure 3:
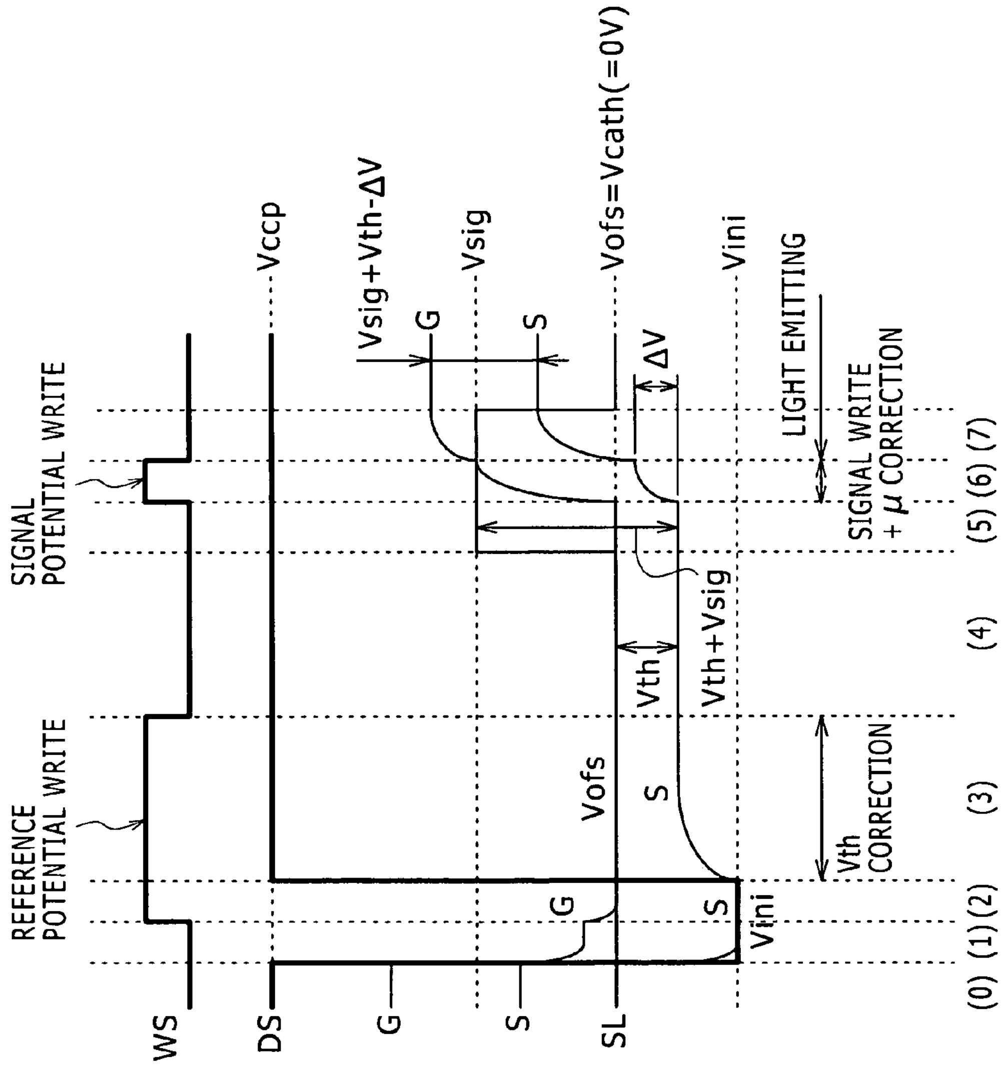
FIG. 3 is a timing chart indicative of an operation of the display apparatus shown in FIGS. 1 and 2.

FIG. 3 shows a timing chart indicative of an operation of the pixel 2 shown in FIG. 2. It should be noted that this timing chart is not indicative of one embodiment of the invention, but is a first reference example indicative of an ideal operation status. This timing chart represents a potential change of scan line WS, a potential change of power supply line DS, and a potential change of signal line SL with reference to a common time axis. In parallel to these potential changes, changes of the gate G and the source S of the drive transistor Trd are also indicated.

In this timing chart, periods (0) to (7) are provided in match with operational transitions of the pixel 2. First, in the light emitting period (0), the power supply line DS is at high potential Vccp and the drive transistor Trd is supplying drive current Ids to the light emitting device EL. Drive current Ids flows from the power supply line DS that is at high potential Vccp into common ground line Vcath through the light emitting device EL via the drive transistor Trd.

Next, in period (1), the power supply line DS is switched from high potential Vccp to low potential Vini. This discharges the power supply line DS to Vini and the source potential of the drive transistor Trd goes up to a potential near Vini. If the wiring capacity of the power supply line DS is relatively large, it is a good practice to switch the power supply line DS from high potential Vccp to low potential Vini as comparatively early as possible.

In period (2), when the scan line WS is changed from low level to high level, the sampling transistor Tr1 gets in a conduction state. At this moment, the signal line SL is at reference voltage Vofs. Therefore, the gate potential of the drive transistor Trd provides reference potential Vofs of the signal line SL through the conductive sampling transistor Tr1. At the same time, the source potential of the drive transistor Trd is fixed to low potential Vini. Consequently, the source potential of the drive transistor Trd is reset to potential Vini that is lower enough than reference voltage Vofs of the signal line SL. To be more specific, low potential Vini of the power supply line DS is set so as to make a potential between gate and source (or a difference between gate potential and source potential) of the drive transistor Trd greater than threshold voltage Vth of the drive transistor Trd.

As seen from the above description, period (1) and period (2) provide the preparatory processes for a threshold voltage correcting operation. Namely, in this preparatory process, while the control terminal that is the gate G of the drive transistor Trd is held at reference voltage Vofs, gate-to-source voltage Vgs between the current terminals that provide the source S of the drive transistor Trd is set higher than threshold voltage Vth, thereby turning on the drive transistor Trd.

Next, in the Vth cancel period (3), the power supply line DS shifts from low potential ini to high potential Vccp, upon which the source potential of the drive transistor Trd starts rising. When the gate/source voltage Vgs of the drive transistor Trd has reached threshold voltage Vth, the current is cut off. Thus, a voltage equivalent to the threshold voltage Vth of the drive transistor Trd is written to the storage capacitor (pixel capacitor) Cs. This is a threshold voltage correcting operation. At this moment, in order to make the current solely flow to the storage capacitor Cs side and not the light emitting device EL side, the potential of common ground line Vcath is set in advance so as to cut off the light emitting device EL.

As seen from the above description, this Vth cancel period (3) provides the energizing process of a threshold voltage correcting operation. In this energizing process, the drive transistor Trd is energized with the gate G held at reference potential Vofs and, when the drive transistor Trd is cut off, a voltage equivalent to the threshold voltage appearing between the gate and source of the drive transistor Trd is held in the storage capacitor Cs.

Next, in the period (4), the scan line WS shifts to the low potential size, upon which the sampling transistor Tr1 goes off. At this moment, the gate G of the drive transistor Trd floats, but the gate-to-source voltage Vgs is in a cut off state because the gate-to-source voltage Vgs is equal to the threshold voltage Vth of the drive transistor Trd, no drain current Ids flowing. However, this is an ideal state; actually, because the drive transistor Trd involves a current leak, the drain current Ids flows even though small. Consequently, the source potential of the drive transistor Trd fluctuates, thereby causing the potential of the floating gate G to fluctuate, which is referred to as a bootstrap phenomenon.

Next, in the period (5), the potential of the signal line SL changes from reference voltage Vofs to sampling potential (signal potential) Vsig. Consequently, preparations become ready for a next sampling operation and mobility correcting operation (signal write and mobility μ cancel).

Then, in the signal write/mobility μ cancel period (6), the scan line WS shifts to the high potential side, upon which the sampling transistor Tr1 is turned on. Therefore, the gate potential of the drive transistor Trd becomes signal potential Vsig. Since the light emitting device EL is in the cut off state (a high impedance state) beforehand, the drain-to-source current Ids of the drive transistor Trd flows into the light emitting device capacitor and the sub capacitor Csub, starting charging these capacitors. Therefore, the source potential of the drive transistor Trd starts rising and the gate-to-source voltage Vgs of the drive transistor Trd gradually becomes Vsig+Vth−ΔV. Thus, the sampling of signal potential Vsig and the adjustment of correction amount ΔV are executed at the same time. As Vsig increases, Ids increases and also the absolute value of ΔV. Therefore, the mobility correction in accordance with light emitting luminance level is executed. If Vsig is constant, as the mobility μ of the drive transistor Trd increases, the absolute value of ΔV increases. In other words, as the mobility μ increases, negative feedback ΔV increases, so that the fluctuation of the mobility μ for each pixel can be removed.

Last, in the light emitting period (7), the scan line WS shifts to the low potential side, upon which the sampling transistor Tr1 is turned off. Consequently, the gate G of the drive transistor Trd is disconnected from the signal line SL. At the same time, the drain current Ids starts flowing in the light emitting device EL. This raises the anode potential of the light emitting device EL in accordance with the drive current Ids. The rise of the anode potential of the light emitting device EL is nothing but the use of the source potential of the drive transistor Trd. When the source potential of the drive transistor Trd rises, the gate potential of the drive transistor Trd also rises by the bootstrap operation of the storage capacitor Cs. The amount of rise of the gate potential becomes equal to the amount of rise of the source potential. Therefore, the gate-to-source voltage Vgs of the drive transistor Trd during the light emitting period (7) is held at a constant level of Vsig+Vth−ΔV. It should be noted that, in the above description, Vgs is computed with Vofs=Vcath=0 V.

Figure 4:
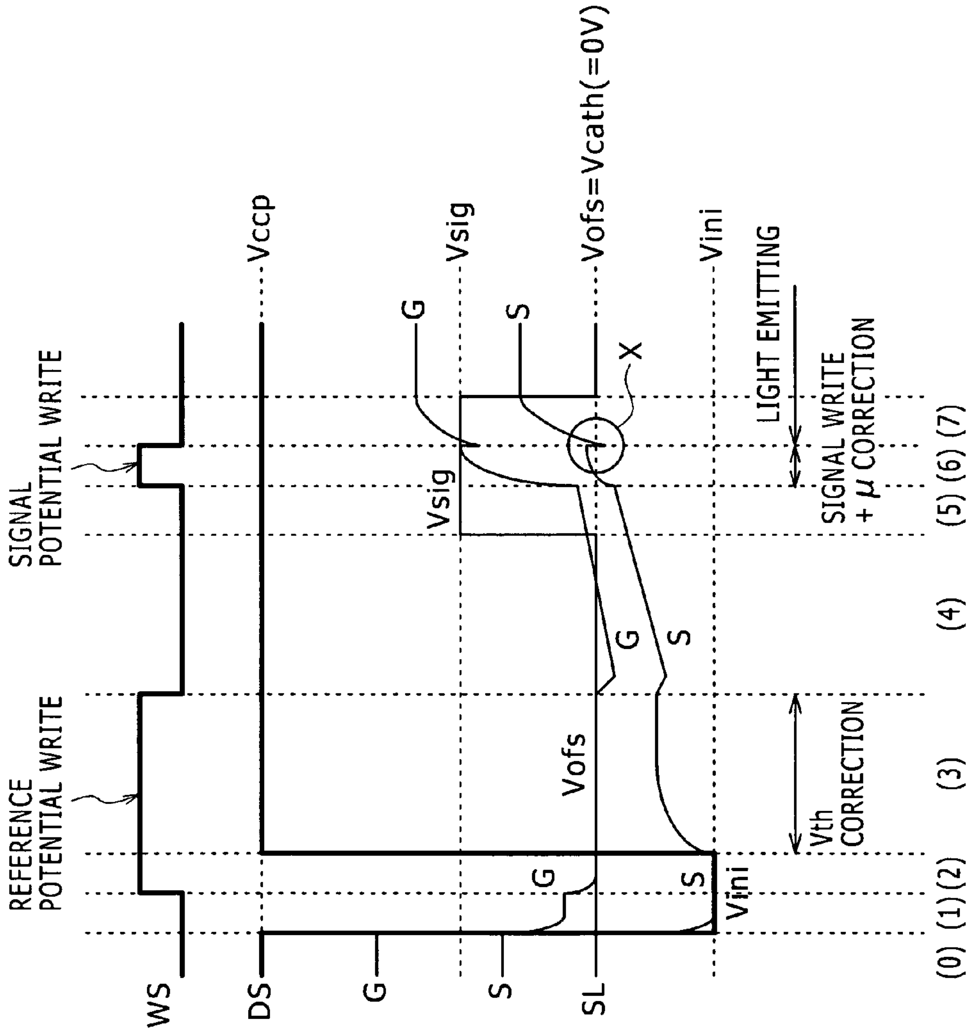
FIG. 4 is a timing chart indicative of another operation of the above-mentioned display apparatus.

FIG. 4 is a timing chart indicative of an operation of the display apparatus shown in FIGS. 1 and 2. This timing chart is representative of the actual potential changes of gate G and source S deviated from an ideal state providing a second reference example. For easy understanding, the same notation as that of the first reference example shown in FIG. 3 is used. As shown, in the second reference example indicative of an actual operation as with the first reference example, after an energizing process in the Vth cancel period (3), the scan line WS is lowered to turn off the sampling transistor Tr1. This temporarily disconnects the gate G of the drive transistor Trd from the signal line, thereby getting in a floating state. At this moment, switching of the sampling transistor Tr1 couples the gate G, thereby fluctuating the potential of the gate G. Accordingly, the potential of source S fluctuates. In addition, since there is a fluctuation in the characteristics of the drive transistor Trd of each pixel, a leak current flows between the drain and source of the drive transistor Trd. Affected by this leak, the source potential rises in the floating period (4). This causes the potential of the gate G to rise, too. This indicates that the same phenomenon as so-called bootstrap is taking place in this floating period (4).

Then, in the write period (6), the control signal is applied to the scan line WS again to turn on the sampling transistor Tr1, thereby writing signal potential Vsig to the gate G of the drive transistor Trd. At this moment, the potential of source S has slightly risen, so that the potential is a source potential indicated by X at the time when the write period (6) has ended. Since the source potential S and the gate potential G have risen during the floating period (4) because of the leak, the source potential S at the time when the write period (6) has ended is not necessarily constant, being different from a pixel to another. Hence, when the write period (6) has been completed, the source-to-gate voltage Vgs of the drive transistor Trd fluctuates between pixels, causing a difference in light emitting luminance. Generally, the trend of the leak of the drive transistor Trd appears along the scan line WS (line), so that the fluctuation of Vgs results in a horizontal irregularity of stripes at the time of emitting, thereby impairing screen uniformity. As the total number of pixels in the pixel array section increases caused by the increased resolution of display apparatuses, the horizontal scan period is shortened by that degree, the Vth cancel period (3) may not be sufficiently allocated. Therefore, the fluctuation of Vth of the drive transistor Trd may not be sufficiently canceled. If this state is further affected by the fluctuation of the leak of the drive transistor Trd, Vgs fluctuates to a large degree, thereby deteriorating the unevenness of stripes.

Figure 5:
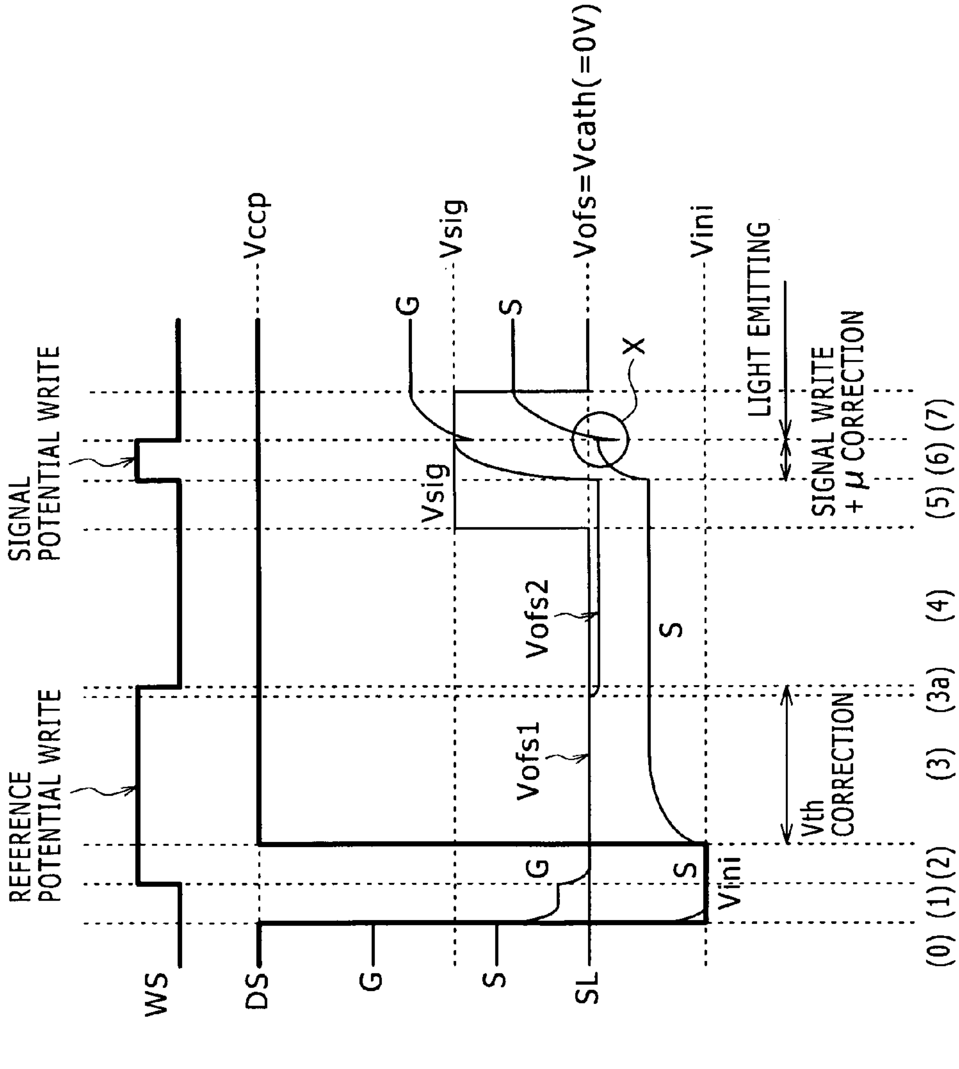
FIG. 5 is a timing chart indicative of a still another operation of the above-mentioned display apparatus.

FIG. 5 shows a timing chart indicative of an operation of the display apparatus shown in FIGS. 1 and 2. This timing chart is representative of one embodiment of the invention. For easy understanding, the same notations as those shown in FIGS. 3 and 4 are adopted. As shown, in the embodiment of the invention, after the energizing process of the Vth period (3) and before getting in the floating period (4), a period 3*a* is inserted, in which a compression process is executed. In this compression process, the reference potential Vofs applied to the gate G of the drive transistor Trd is altered to compress the gate-to-source voltage Vgs higher than the voltage equivalent to the threshold voltage Vth, thereby surely turning off the drive transistor Trd. To be more specific, in this compression process (3*a*), immediately before turning off the sampling transistor Tr1 by write scanner's clearing the control signal while maintaining the power supply line DS at the high potential Vccp, the signal driver downward switches the level of the reference potential Vofs from Vofs1 to Vofs 2. Namely, immediately before the end of the Vth cancel period (3), the reference potential Vofs1 applied to the signal line SL is lowered to level Vofs2 at which Vth of the drive transistor Trd is cut in. Consequently, Vgs gets smaller than Vth, so that the current leak of the drive transistor Trd can be suppressed. As a result, the source potential of the drive transistor Trd will not fluctuate during the floating period (4), thereby suppressing the unevenness of light emitting luminance caused by the fluctuation of the leak current of the drive transistor.

It should be noted that, in lowering the signal line SL from the reference potential Vofs1 to Vofs2 in the compression process (3*a*), a drastic voltage variation may cause a coupling to the source S to open Vgs. In order to prevent this phenomenon, the transient may be smoothed to a degree at which no coupling takes place. The transient smoothing may be executed by blunting the rising edge of control signal pulse to be applied to the gate of the sampling transistor Tr1. For example, designing smaller the size of the N-channel transistor making up the last stage of the write scanner allows to blunt the rising edge of the gate pulse. Alternatively, the waveform of the reference potential Vofs with the falling edge blunted may be supplied to the power supply connected to the output buffer of the signal driver. Thus, in the present embodiment of the invention, in the reference potential write period (preparation period (2) and the Vth cancel period (3)) in which the sampling transistor Tr1 is turned on, the reference potential Vofs1 supplied from the signal line is applied to the gate G of the drive transistor Trd. In the final stage of this reference potential write period, the gate-to-source voltage Vgs of the drive transistor Trd is Vth. Immediately before the end of this reference potential write period, the reference potential Vofs1 is downward switched to Vofs2 to compress Vgs. Consequently, the drive transistor Trd is fully turned off, so that, in the floating period (4), no leak current flows, thereby making stable the potential of the source S of the drive transistor Trd.

Then, in the signal potential write period (6), the control signal is applied to the scan line WS again, turning on the sampling transistor Tr1. At this point of time, the signal line SL has been switched to the signal potential Vsig, so that Vsig is written to the gate G of the drive transistor Trd. At this moment, part of the drain current Ids that flows in the drive transistor Trd is negatively fed back to the storage capacitor, so that the potential of source S of the drive transistor Trd rises to X as shown. Because the potential X is free from the influence of the leak, there is no fluctuation between pixels, thereby maintaining Vgs at a constant level to remove the unevenness in light emitting luminance.

Figure 6:
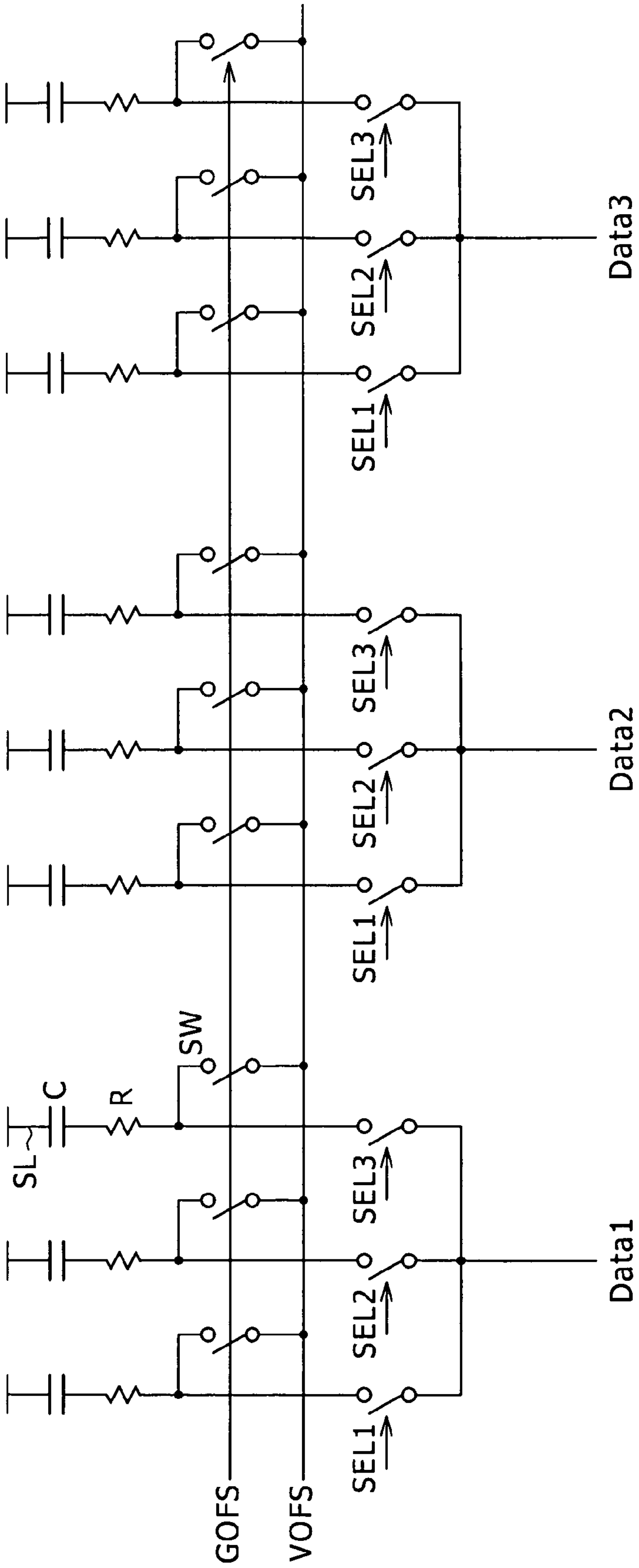
FIG. 6 is a circuit diagram illustrating an exemplary configuration of a horizontal sector (or a signal driver) included in the display apparatus shown in FIGS. 1 and 2.

FIG. 6 is a schematic circuit diagram illustrating an exemplary configuration of the horizontal selector (signal driver) 3 included in the display apparatus shown in FIG. 1. This signal driver 3 has a plurality of data lines Data1, Data2, and Data3, and so on and line-sequentially supplies data for one line to the signal lines SL arranged in column at the same time. In the example shown in FIG. 6, one data line Data is connected with three signal lines SL via selector switches SEL1, SEL2, and SEL3, in which the signal potential supplied to one data line Data is supplied to the three signal lines SL in a time division manner.

A control line GOFS and a potential line VOFS are arranged in row, intersecting the signal lines SL arranged in column. The potential line VOFS is connected to each signal line SL with a switch SW. This switch SW is turned on/off by the control signal that is applied to the control line GOFS. A plurality of pixels connected to each signal line SL are each schematically represented by a capacitor C and a resistor R.

Figure 7:
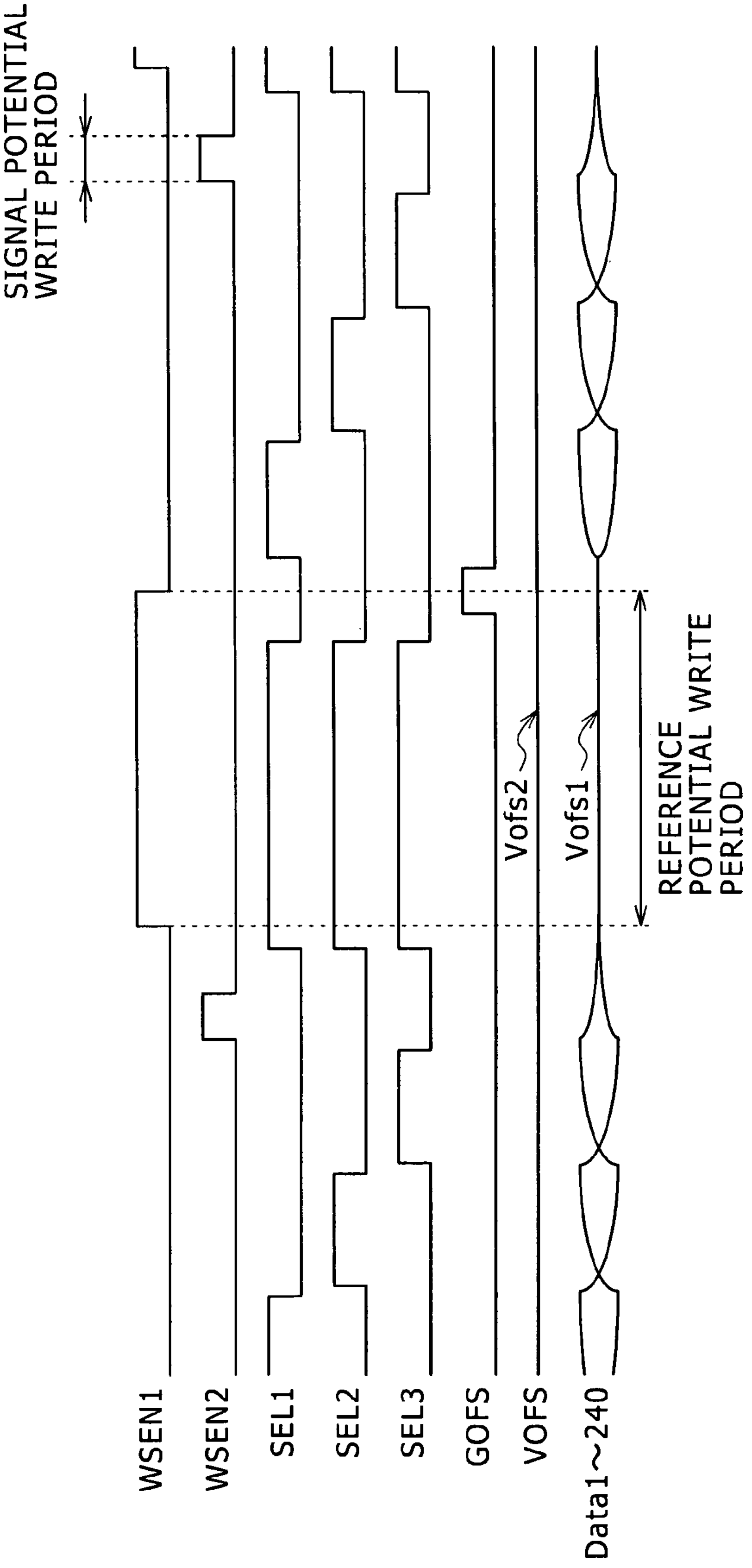
FIG. 7 is a timing chart indicative of an operation of the signal driver shown in FIG. 6.

FIG. 7 is a timing chart indicative of an operation of the signal driver (or the horizontal selector) 3 shown in FIG. 6. The control signals to be applied to a set of three selector switches SEL1, SEL2, and SEL3 are represented by the same reference notations SEL1, SEL2, and SEL3. Likewise, the control signal to be applied to the control line GOFS is represented by the same reference notation GOFS. The potential of the potential line VOFS is fixed to Vofs2. Further, the signal driver 3 has 240 data lines, data (or signal potentials) to be applied these data lines being represented by Data1 to Data 240. In addition, although not directly related with the operation of the signal driver 3, timing signals WSEN1 and WSEN2 for controlling an operation of the write scanner side are represented in the timing chart shown in FIG. 7 as arranged along the time axis. The timing signal WSEN1 specifies the reference potential write period shown in FIG. 5. The timing signal WSEN2 specifies the signal write period shown in FIG. 5.

The timing signal WSEN1 goes high to get in the reference potential write period. At this moment, the potential to be applied to each data line Data is switched from the signal potential to the reference potential Vofs1. At the same time, the select signal SEL1, SEL2, and SEL3 go high simultaneously. These selector switches SEL1, SEL2, and SEL3 go on simultaneously to output the reference potential Vofs1 applied to the data line Data to the three signal lines SL. Therefore, during the reference potential write period, the reference potential Vofs1 is simultaneously written to the signal lines SL arranged in column.

Then, immediately before the WSEN1 is switched from high to low, the control signal GOFS goes high, upon which the switches SW are simultaneously turned on. At this point of time, the selector 1, the selector 2, and the selector 3 are in the off state. The potential Vofs2 of the potential line VOFS is written to each signal line SL via the switch SW. Thus, immediately before the end of the reference potential write period, the potential of each signal line SL is downward switched from Vofs1 to Vofs2, thereby realizing the above-mentioned Vgs compression process.

Thereafter, a predetermined signal potential is supplied to each data line Data. In synchronization therewith, the select signals SEL1, SEL2, and SEL3 go high in a time division manner, writing the corresponding signal potential to the corresponding signal lines SL. Next, when the timing signal WSEN2 goes high, the signal potential write period goes on, in which the sampling transistors of the pixels for one line are simultaneously turned on. This samples the signal potential applied to each signal line SL into the pixels for one line, executing a line-sequential write operation.

Figure 8:
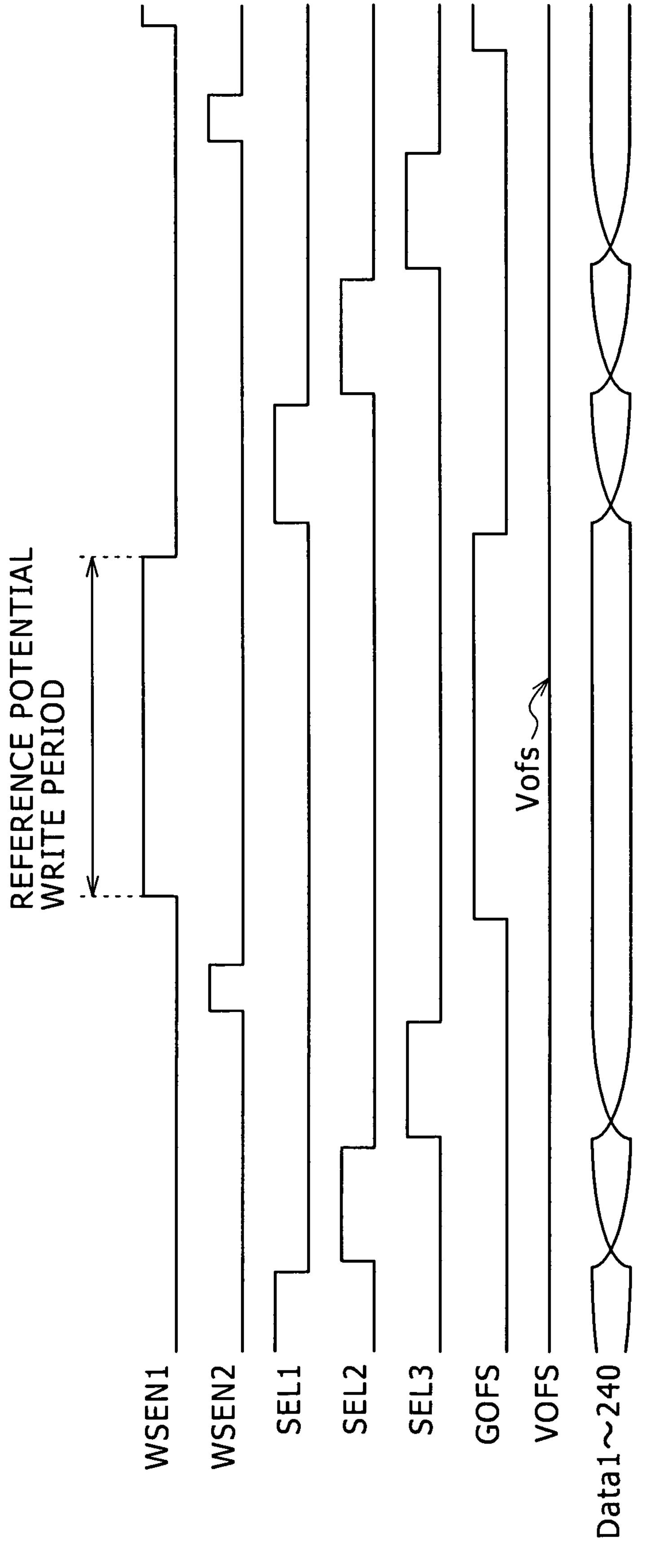
FIG. 8 is a timing chart indicative of another operation of the above-mentioned signal driver.

FIG. 8 is a timing chart indicative of a operation of the signal driver 3 shown in FIG. 6. It should be noted that this timing chart is representative of a reference example in which reference potential switching is not executed. As shown, in this reference example, while a signal potential is supplied to the data line Data, the reference potential Vofs is supplied to the potential line VOFS. When the timing signal WSEN1 goes high to get in the reference potential write period, the control signal GOFS goes high, upon which the switches SW are simultaneously turned on. Via these turned-on switches SW, the reference potential Vofs of the potential line VOFS is supplied to the signal lines SL arranged in column. As seen from the above description, the level switching of the reference potential Vofs is not executed in this reference example.

Figure 9:
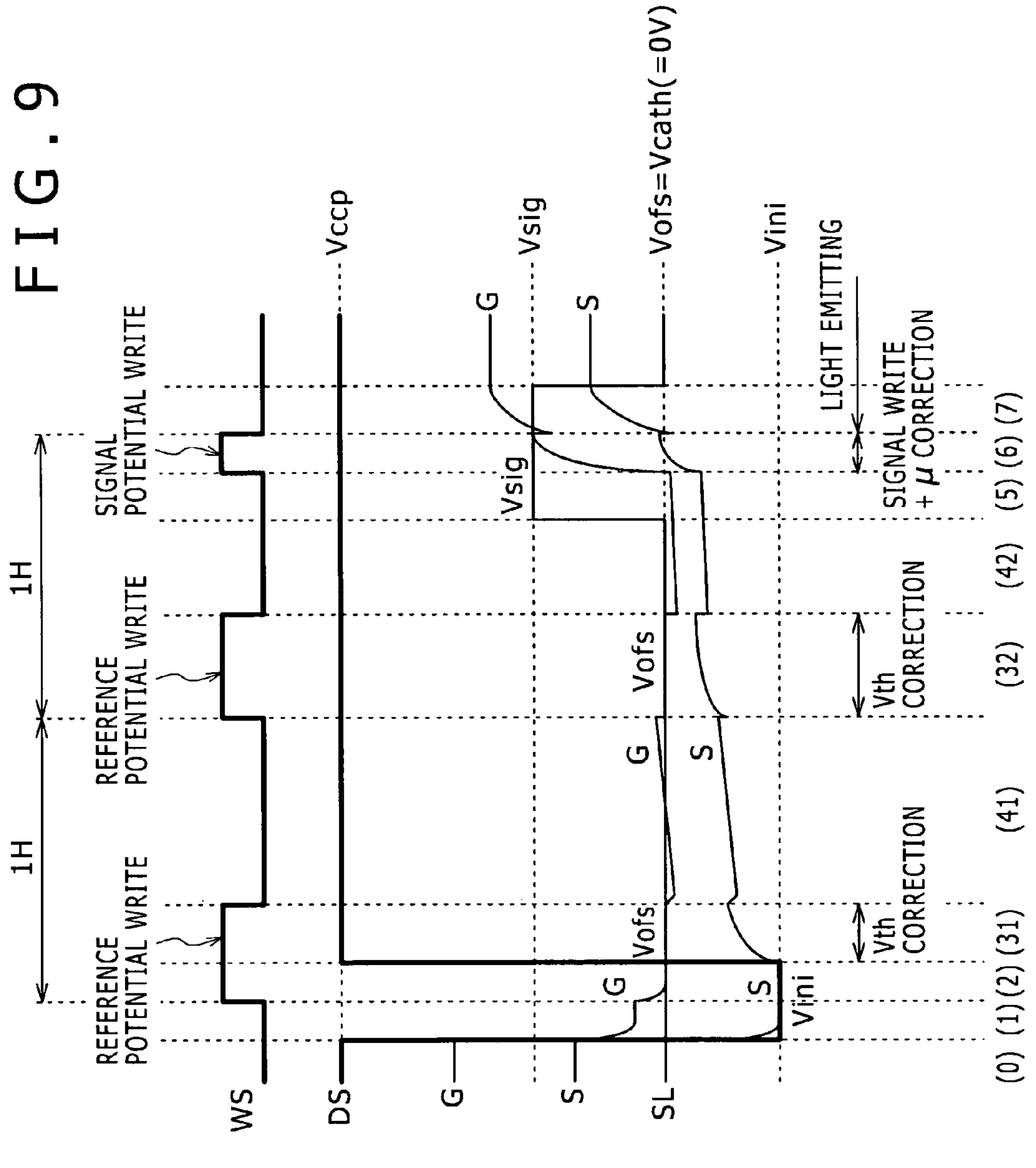
FIG. 9 is a timing chart indicative of an operation of the display apparatus shown in FIGS. 1 and 2.

FIG. 9 is a timing chart indicative of an operation of the display apparatus shown in FIGS. 1 and 2. This timing chart is representative of a third reference example. For easy understanding, the same reference notation as that of the previous reference examples shown in FIGS. 3 and 4 is used. A difference lies in that, in the third reference example, the energizing process of a threshold voltage correcting operation is repeatedly executed several times in a time division manner. Generally, pixels threshold correcting operation, signal potential write operation, and light emitting operation are line-sequentially executed for each line. Therefore, a threshold voltage correcting operation is also executed, one horizontal scan period (1H) for each line. However, as the pixel definition goes higher, the number of scan lines increases, so that the H period is shortened by that amount, disabling to provide a sufficient Vth cancel period. Therefore, it may be executed the energizing process requiring time in a threshold voltage correcting operation over a plurality of horizontal periods in a time division manner as described in this reference example. The reference example shown in FIG. 9 shows a case in which the Vth cancel operation has been executed twice. The energizing process is executed in the first Vth cancel period (31); however, because the time is not long enough, Vgs has not reached Vth. When the first Vth cancel period (31) comes to an end, the control signal is once switched to the low level to turn off the sampling transistor Tr1, disconnecting the gate G of the drive transistor Trd from the signal line SL. Consequently, the gate G of the drive transistor Trd gets in a floating state. During this floating period (41), the drive transistor Trd is not off, therefore a leak current flows. Therefore, as the source potential S rises, the potential of the gate G rises in association therewith. This is a so-called bootstrap phenomenon. This current leak becomes large as the Vth cancel is insufficient in the first Vth cancel period (31). Consequently, at the time the floating period (41) ends, the source voltage of the drive transistor Trd largely fluctuates from pixel to pixel.

Next, in the second Vth cancel period (32), the control signal goes high again to execute the energizing process with Vofs applied to the gate G of the drive transistor Trd. This causes Vgs to reach Vth. Then, after getting in the floating period (42) again, the signal potential Vsig is written to the gate G of the drive transistor Trd in the signal potential write period (6) and, at the same time, the source potential also rises to a predetermined level. However, if the Vth cancel is insufficient in the first energizing process, a large fluctuation occurs in the current leak in the subsequent floating period (41) to adversely affect the second threshold correcting operation, thereby eventually leaving the Vgs fluctuation for each pixel at the time when the signal potential write period has ended. This remaining fluctuation is recognized as a stripe unevenness at the time of light emitting.

Figure 10:
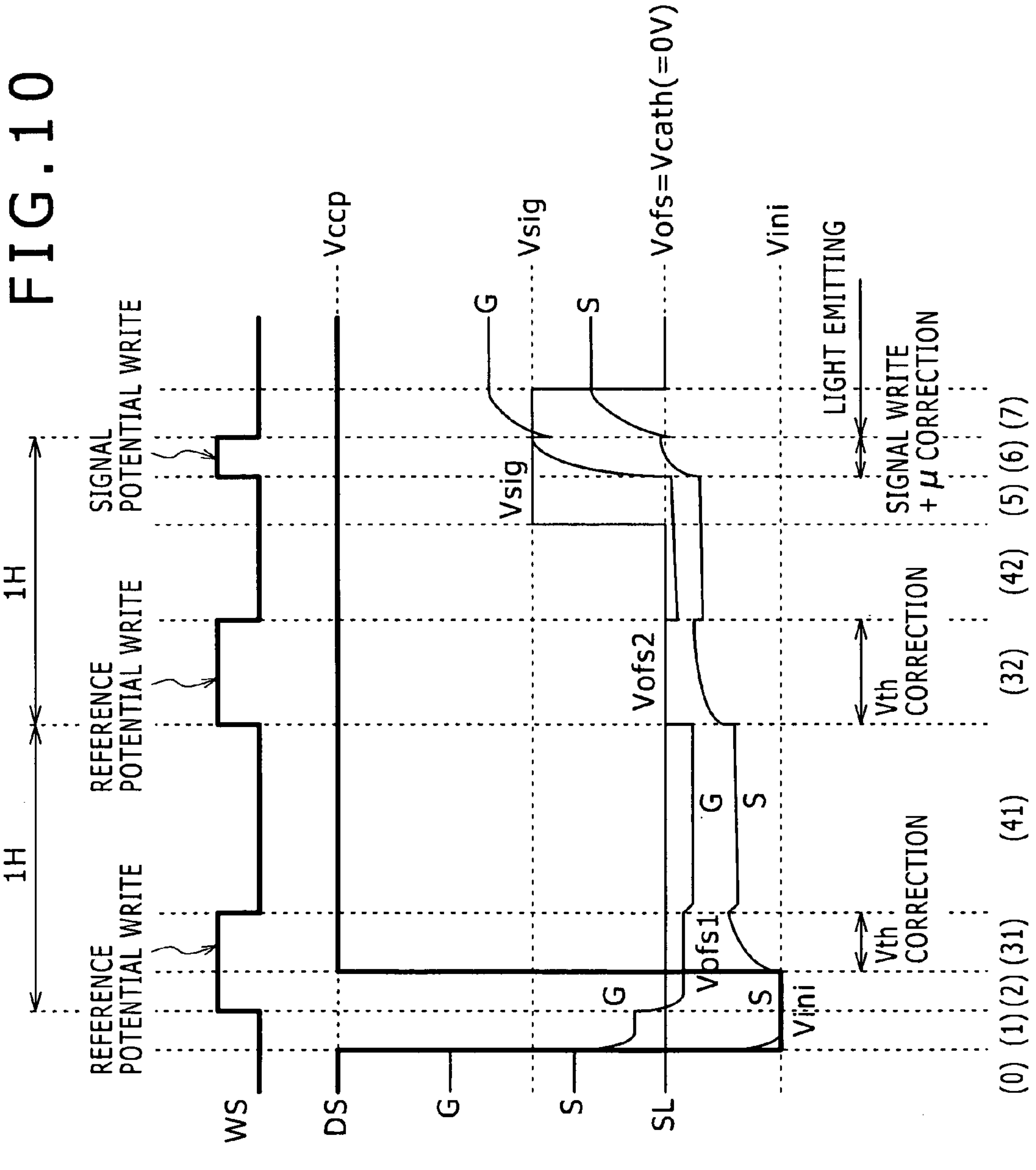
FIG. 10 is a timing chart indicative of another operation of the display apparatus shown in FIGS. 1 and 2.

FIG. 10 is a timing chart indicative of an operation of the display apparatus shown in FIGS. 1 and 2. This timing chart is represents a second embodiment of the invention that is configured to overcome the above-mentioned problems involved in the third reference examples shown in FIG. 9. In this second embodiment, a threshold voltage correcting operation is executed in a time division manner; namely, the first energizing process (31) and the second energizing process (32) are executed with a time lag in between. One of characteristics of the present invention is that the reference potential Vofs1 used in the first Vth cancel period (31) and the reference potential Vofs2 used on the second Vth cancel period (32) are different from each other. To be more specific, in the first Vth cancel period (31), the reference potential Vofs1 to be applied to the gate G of the drive transistor Trd is lower than the reference potential Vofs2 to be written to the gate G in the second Vth correction period (32). Consequently, if the first Vth cancel period (31) had ended insufficiently, the current leak of the drive transistor Trd that is caused by Vgs's opening wide can be prevented or minimized by shrinking Vgs by setting Vofs1 in advance. Generally, executing the Vth cancel operation n times requires to set the Vofs to be used in the first Vth cancel to the lowest level and the Vofs to be used in the second and subsequent Vth cancels to higher levels sequentially or at least a level equal to the previous level. This technique can suppress the current leak that may occur during the floating period after the Vth cancel.

Figure 11:
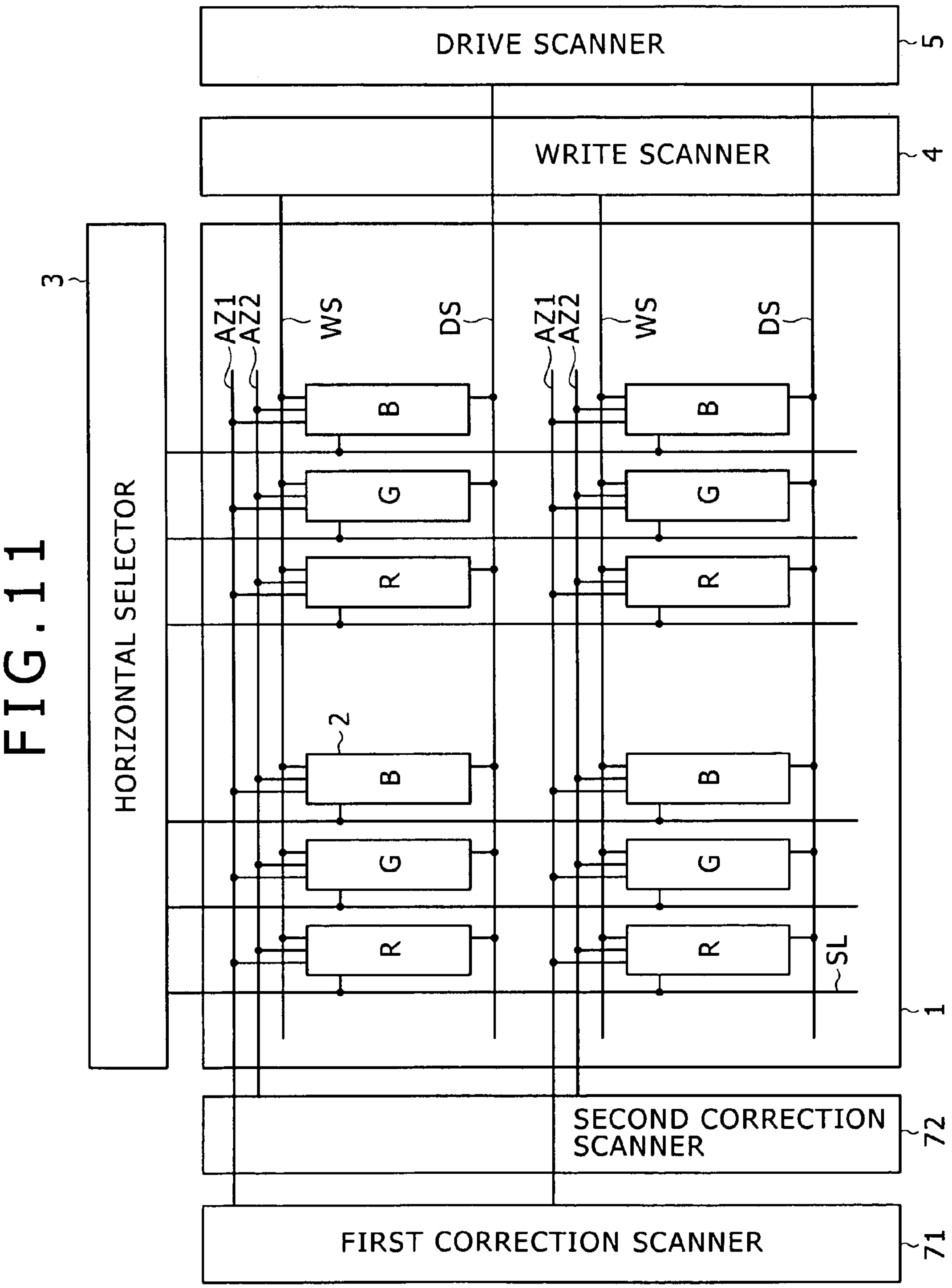
FIG. 11 is an overall block diagram illustrating a display apparatus practiced as another embodiment of the invention.

FIG. 11 is a block diagram illustrating a display apparatus practiced as another embodiment of the invention. As shown, this display apparatus is basically made up of a pixel array block 1, a scanner block, and a signal block. The pixel array block 1 has a first scan line WS, a second scan line AZ1, a third scan line AZ2, and a fourth scan line DS that are arranged in row, signal lines SL arranged in column, pixel circuits 2 arranged in matrix connected to these scan lines WS, AZ1, AZ2, DS, and SL, and a plurality of power supply lines for supplying power a first potential Vss1, a second potential Vss2, and a third potential Vcc that are necessary for operations of these pixel circuits 2. The signal block is made up of a horizontal selector 3 that supplies video signals to the signal line SL. The scanner block is made up of a write scanner 4, a drive scanner 5, a first correction scanner 71, and a second correction scanner 72, supplying controls signals to the first scan line WS, the fourth scan line DS, the second scan line AZ1, and the third scan line AZ2, respectively, thereby sequentially scanning the pixel circuits on a row basis.

Figure 12:
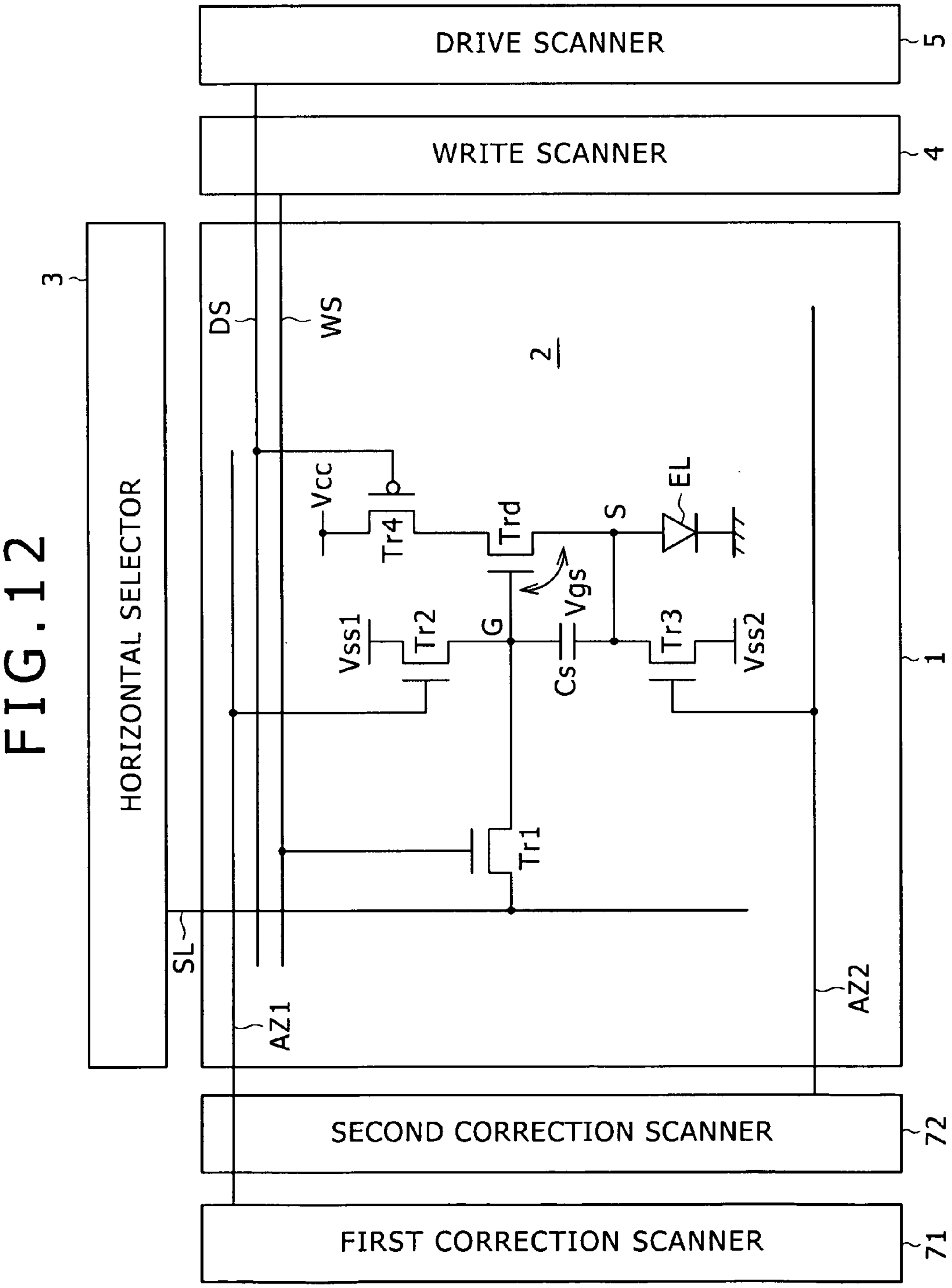
FIG. 12 is a circuit diagram illustrating an exemplary configuration of a pixel included in the display apparatus shown in FIG. 11.

FIG. 12 is a circuit diagram illustrating an exemplary configuration of a pixel circuit to be built in the display apparatus shown in FIG. 11. A pixel 2 shown in FIG. 12 has a sampling transistor Tr1, a drive transistor Trd, a first switching transistor Tr2, a second switching transistor Tr3, a third switching transistor Tr4, a storage capacitor Cs, and a light emitting device EL. The sampling transistor Tr1 conducts in accordance with a control signal supplied from the first scan line WS during a predetermined sampling period to sample the signal potential of a video signal supplied from the signal line SL into the storage capacitor Cs. The storage capacitor Cs applies an input voltage Vgs to the gate G of the drive transistor Trd in accordance with the signal potential of the sampled video signal. The drive transistor Trd supplies an output current Ids to the light emitting device EL in accordance with the input voltage Vgs. The light emitting device EL emits light at the luminance in accordance with the signal potential of the video signal by the output current Ids supplied from the drive transistor Trd during a predetermined light emitting period.

Before the sampling period, the first switching transistor Tr2 conducts in accordance with the control signal supplied from a second scan line AZ1 to set the gate G of the drive transistor Trd to a first potential Vss1. Before the sampling period, the second switching transistor Tr3 conducts in accordance with the control signal supplied from a third scan line AZ2 to set the source S of the drive transistor Trd to a second potential Vss2. Before the sampling period, the third switching transistor Tr4 conducts in accordance with the control signal supplied from a fourth scan line DS connects the drive transistor Trd to a third potential Vcc, thereby holding a voltage equivalent to threshold voltage Vth of the drive transistor Trd in the storage capacitor Cs, thereby correcting the influence of the threshold voltage Vth. Further, the third switching transistor Tr4 conducts again in accordance with the control signal supplied from the fourth scan line DS during the light emitting period to connect the drive transistor Trd to the third potential Vcc, thereby flowing the output current Ids to the light emitting device EL.

As seen from the above description, the pixel circuit 2 has five transistors Tr1 to Tr4, one drive transistor Trd, one storage capacitor Cs, and the light emitting device EL. The transistors Tr1 to Tr3 and the Trd are each an n-channel polysilicon TFT. Only the transistor Tr4 is a p-channel polysilicon TFT. However, the present invention is not restricted thereto; for example, n-channel and p-channel TFTs can coexist appropriately. The light emitting device EL is a diode-type organic EL device having anode and cathode, for example. However, the present invention is not restricted thereto; for example, the light emitting device in the present invention may include any device that emits light generally driven by electric current.

Figure 13:
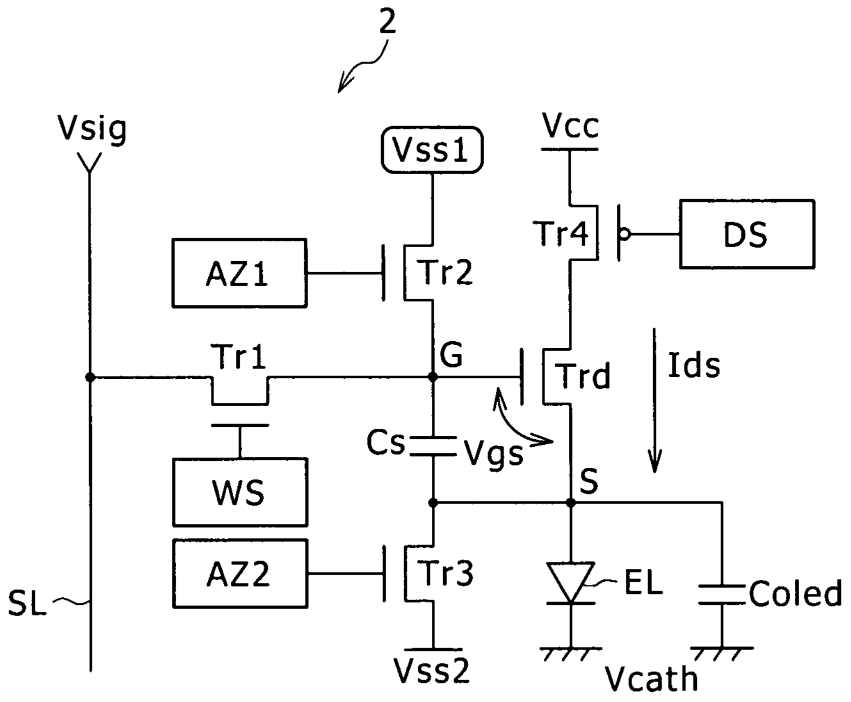
FIG. 13 is a circuit diagram illustrating an exemplary configuration of the pixel.

FIG. 13 is a schematic diagram illustrating the pixel circuit 2 in the display apparatus shown in FIG. 12. Additionally written for easy understanding are a video signal Vsig sampled by the sampling transistor Tr1, the input voltage Vgs and output current Ids of the drive transistor Trd, and a capacity component Coled of the light emitting device EL. Three supply lines Vss1, Vss2, and Vcc are also added. Of the three power supplies, Vcc and Vss2 are fixed power supplies. On the other hand, Vss1 given to the gate G of the drive transistor Trd as a reference potential is a variable power supply. This variable power supply is made up of an external panel module, supplying reference potential Vss1 to each pixel circuit 2 via wiring, this potential changing in level in a predetermined timed relation.

Figure 14:
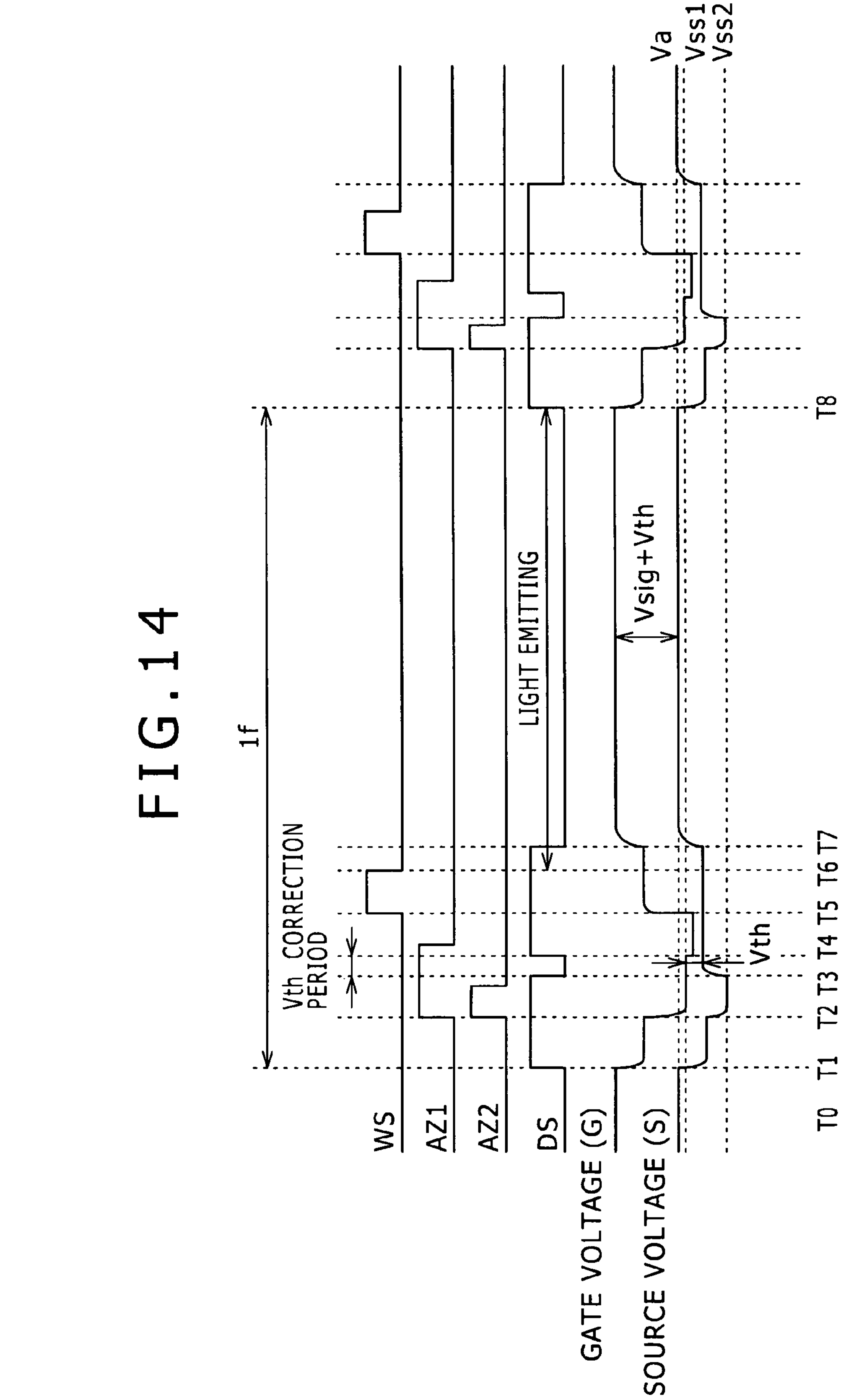
FIG. 14 is a timing chart indicative of an operation of the display apparatus shown in FIG. 11.

FIG. 14 is a timing chart of the pixel circuit shown in FIG. 13. The following specifically describes an operation of the pixel circuit shown in FIG. 13 with reference to FIG. 14. FIG. 14 is indicative of waveforms of a control signal to be applied to the scan lines WS, AZ1, AZ2, and DS along time axis T. For the brevity of notation, the control signals are also denoted by the same reference notations as those of the scan lines. Since the sampling transistors Tr1, Tr2, and Tr3 are of n-channel type, these transistors are turned on when the scan lines WS, AZ1, and AZ2 go high and turned off when these scan lines go low. On the other hand, since the third switching transistor Tr4 is of p-channel type, this transistor is turned off when the scan line DS goes high and turned on when the scan line DS goes low. It should be noted that this timing chart also represent potential changes of the gate G and source S of the drive transistor Trd in addition to the waveforms of the control signals WS, AZ1, AZ2, and DS.

In the timing chart shown in FIG. 14, timings T1 to T8 provide one field (1/*f*). Each row of the pixel array is scanned once during one field. This timing chart is indicative of the waveforms of control signals WS, AZ1, AZ2, and DS to be applied to pixels for one row.

In timing To before a field concerned starts, all control signals WS, AZ1, AZ2, and DS are low. Therefore, while the n-channel type transistors Tr1, Tr2, and Tr3 are off, the p-channel type transistor Tr4 is on. Therefore, because the drive transistor Trd is connected to the power supply Vcc via the transistor Tr4 in the on state, the drive transistor Trd supplies an output current Ids to the light emitting device EL in accordance with a predetermined input voltage Vgs. Consequently, the light emitting device EL is emitting light in timing TO. At this moment, the input voltage Vgs to be applied to the drive transistor Trd is represented by a difference between gate potential (G) and source potential (S).

In timing T1 at which the field concerned starts, the control signal DS changes from low to high. Consequently, the third switching transistor Tr4 is turned off to disconnect the drive transistor Trd from the power Vcc, so that light emitting stops to get in the non-light emitting period. Therefore, in timing T1, all transistors Tr1 to Tr4 are turned off.

Next, in timing T2, control signals AZ1 and AZ2 go high, so that the first switching transistor Tr2 and the second switching transistor Tr3 are turned on. As a result, the gate G of the drive transistor Trd is connected to the reference potential Vss1 and the source S thereof is connected to the reference potential Vss2. Here, if Vss1−Vss2>Vth, where Vss1−Vss2=Vgs>Vth, then preparations for Vth correction to be executed in the subsequent timing T3 are executed. In other words, periods T2 and T3 are equivalent to a reset period of the drive transistor Trd. Let the threshold voltage of the light emitting device EL be VthEL, then VthEL>Vss2. Consequently, a minus bias is applied to the light emitting device EL, so that the light emitting device EL is put in a so-called reverse bias state. This reverse bias state is necessary to normally execute a Vth correcting operation and a mobility correcting operation to be executed later.

In timing T3, the control signal AZ2 is turned low and, immediately thereafter, the control signal DS is turned low. Consequently, while the second switching transistor Tr3 is turned off, the third switching transistor Tr4 is turned on. As a result, the drain current Ids flows into the storage capacitor Cs, starting a Vth correcting operation. At this moment, the gate G of the drive transistor Trd is held at Vss1, in which the current Ids flows until the drive transistor Trd is cut off. When the drive transistor Trd is cut off, the source potential (S) of the drive transistor Trd becomes Vss1−Vth. In timing T4 after the cutting off of the drain current, the control signal DS is turned high again, thereby turning off the third switching transistor Tr4. Further, the control signal AZ1 is also turned low, also turning off the third switching transistor Tr2. As a result, Vth is fixed to the storage capacitor Cs. Thus, the timing T3 and timing T4 provide periods in which the threshold voltage Vth of the drive transistor Trd is detected. Here, the detection periods T3 and T4 are referred to as Vth correction periods.

After detecting the threshold voltage Vth of the drive transistor Trd and writing the detected voltage to the storage capacitor Cs, the level of the reference potential Vss1 applied to the gate G of the drive transistor Trd is switched low in timing T4. Consequently, the gate-to-source voltage Vgs of the drive transistor Trd can be compressed higher than a voltage equivalent to Vth. This compression fully turns off the drive transistor Trd, in which no leak current flows. After this, the control signal AZ1 is switched from high to low to turn off the first switching transistor Tr2, upon which the gate G of the drive transistor Trd is disconnected from the reference potential Vss1, putting the drive transistor Trd into a floating state. In this floating state, the drive transistor Trd is fully off, so that no leak current flows, thereby maintaining the source voltage constantly. The threshold voltage Vth written to the storage capacitor Vgs is compressed by the level switching of the Vss1, which, however, does not cause the light emitting luminance fluctuation because the compression occurs commonly on all pixels. Conversely, the compression of Vgs prevents the leak current from flowing in the drive transistor Trd, thereby removing the influence by that fluctuation.

After the correction of Vth as described above, the control signal WS is switched to high in timing T5 to turn on the sampling transistor Tr1, thereby writing the video signal Vsig to the storage capacitor Cs. As compared with the equivalent capacitor Coled of the light emitting device EL, the storage capacitor Cs is small enough. As a result, most part of the video signal Vsig is written to the storage capacitor Cs. To be correct, difference between Vss1 and Vsig, namely, Vsig−Vss1, is written to the storage capacitor Cs. Therefore, the voltage Vgs between the gate G and source S of the drive transistor Trd becomes a level (Vsig−Vss1+Vth) obtained by adding Vth detected and stored last and Vsig−Vss1 sampled this time. For the brevity of description, let Vss1=0 V, then the gate-to-source voltage Vgs becomes Vsig+Vth as indicated by the timing chart shown in FIG. 4. The sampling of the video signal Vsig is executed until timing T6 in which the control signal WS returns to the low level. Namely, timings T5 and T6 are equivalent to signal write periods.

Next, in timing T7, the control signal DS goes low, turning on the third switching transistor Tr4. Consequently, the drive transistor Trd is connected to the power supply Vcc, so that the pixel circuit goes from the non-light emitting period to a light emitting period. In the preceding timing T6, the control signal WS went low, so that the sampling transistor Tr1 has already been turned off. Hence, the gate G of the drive transistor Trd is disconnected from the signal line SL. Because the application of the video signal Vsig has been cleared, the gate potential (G) of the drive transistor Trd can rise upon turning on of the third switching transistor Tr4, thereby rising along with the source potential (S). It should be noted that, with the pixel circuit according to the present embodiment, the source of the drive transistor Trd is connected to the anode of the light emitting device EL. Hence, the source potential (S) of the drive transistor Trd is also the anode potential Va of the light emitting device EL at the same time. The timing chart shown in FIG. 14 is also indicative of the anode potential Va of the light emitting device EL. This light emitting period ends in timing T8 before a next field.

As described above, in timing T7, the gate potential (G) of the drive transistor Trd becomes ready for rising and the source potential (S) rises in association therewith. This is a bootstrap operation. During this bootstrap operation, the gate-to-source voltage Vgs held in the storage capacitor Cs maintains a value (Vsig+Vth). Namely, this bootstrap operation permits the rise of the anode potential Va of the light emitting device EL while constantly maintaining the Vgs held in the storage capacitor Cs. As the source potential (S) of the drive transistor, namely, the anode potential Va of the light emitting device EL rises, the reserve bias state of the light emitting device EL is cleared, so that the inflow of output current Ids causes the light emitting device EL to actually start light emission. A relationship at this moment between the drain current Ids and the gate voltage Vgs is given by the following equation by substituting Vsig+Vth into the Vgs of the above-mentioned transistor characteristic equation 1:

$$Ids=k\cdot\mu(Vgs-Vth)^2=K\cdot\mu(Vsig)^2$$

In the above equation, k=(½)(W/L)Cox (where W denotes transistor's gate width, L denotes gate length, and Cox denotes gate capacity). This equation is indicative that the term of Vth is canceled and the output current Ids to be supplied to the light emitting device EL is not dependent on the threshold voltage Vth of the drive transistor Trd. Basically, the drain current Ids is determined by the signal voltage Vsig of a video signal. In other words, the light emitting device EL emits light with a luminance in accordance with the video signal Vsig. In addition, this pixel circuit according to the present embodiment constantly maintains the gate voltage Vgs independently of the source potential of the drive transistor, namely, the anode potential Va of the light emitting device. This bootstrap capability allows the screen luminance to be maintained with stability without being affected by the time-dependent variation of the I-V characteristic of the light emitting device EL.

Figure 15:
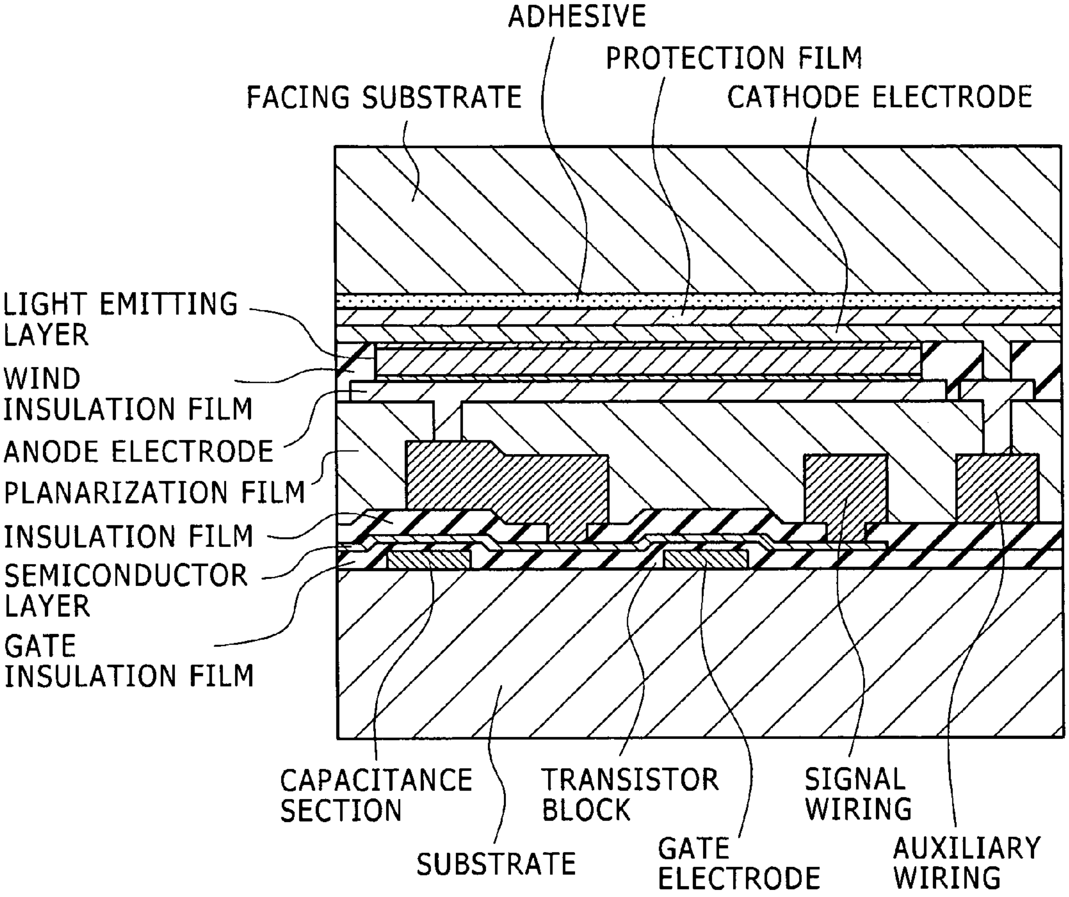
FIG. 15 is a cross section illustrating a device configuration of the above-mentioned display apparatus.

The display apparatus according to the present embodiment has a thin-film device configuration as shown in FIG. 15. FIG. 15 schematically shows a cross sectional structure of a pixel formed on an insulating substrate. As shown, the pixel has a transistor section (in the figure, one TFT is shown for example) including a plurality of thin-film transistors, a capacitor section made up of a storage capacitor for example, and a light emitting section made up of an organic light emitting device EL for example. The transistor section and the capacitor section are formed on the substrate by a TFT process, over which the light emitting section, such as an light emitting device EL, is laminated. Over this laminated light emitting section, a transparent facing substrate is attached with an adhesive, thereby providing a flat panel.

Figure 16:
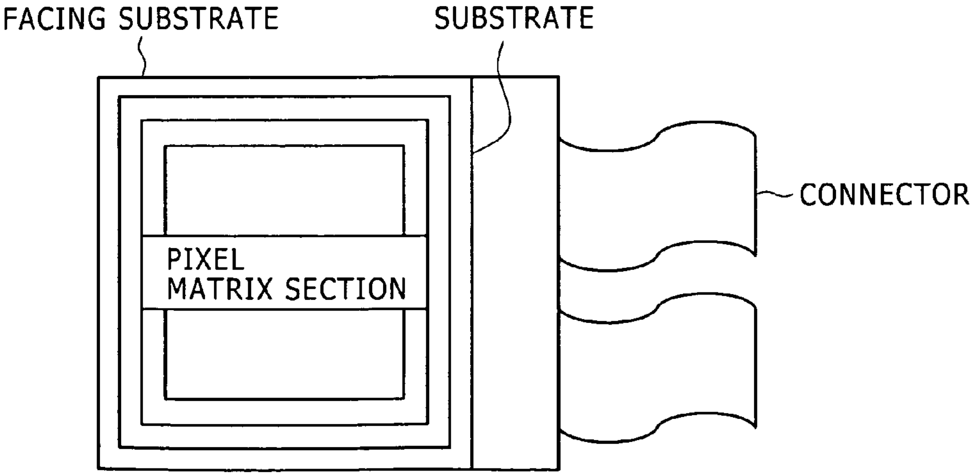
FIG. 16 is a top view illustrating a module configuration of the above-mentioned display apparatus.

The display apparatus according to the present embodiment includes a flat-type module-shaped display apparatus as shown in FIG. 16. For example, the display apparatus shown in FIG. 16 has a pixel array section in which pixels each made up of an organic light emitting device EL, a thin-film transistor, and a thin-film capacitor are integratedly formed on an insulating substrate in a form of matrix. Adhesives are arranged around this pixel array section (or pixel matrix section) on which the facing substrate made up of glass for example is attached, thereby providing a display module. This transparent facing substrate may be arranged with a color filter, a protective film, and a light blocking film, for example, as required. The display module may be arranged with a FPC (Flexible Printed Circuit) for example as a connector through which signals or the like are transferred between the pixel array section and the outside.

The above-described display apparatus according to the present embodiment, having a flat panel shape, is applicable to displays of electronic devices of any fields that are configured to display drive signals supplied from the outside or generated inside these electronic devices as images or video. These electronic devices include digital cameras, laptop personal computers, mobile phones, and video cameras, for example. The following describes some of these electronic devices to which the display apparatus according to the present embodiment is applied.

Figure 17:
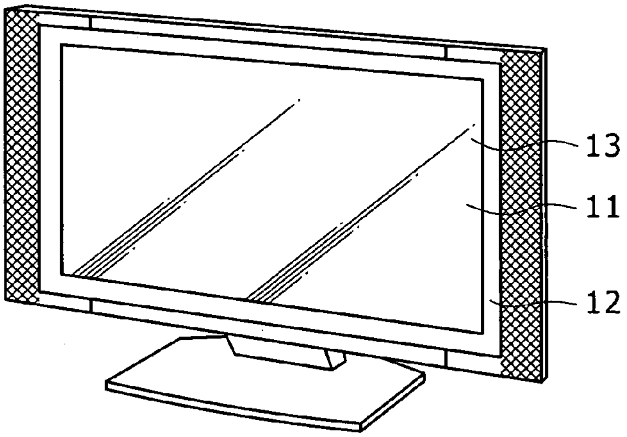
FIG. 17 is a perspective view illustrating a television set having the above-mentioned display apparatus.

FIG. 17 shows a television set to which the display apparatus according to the present embodiment is applied. This television set has a video display screen 11 made up of a front panel 12 and a filter glass 13, for example, and is manufactured by use of the display apparatus according to the present embodiment as the video display screen 11.

Figure 18:
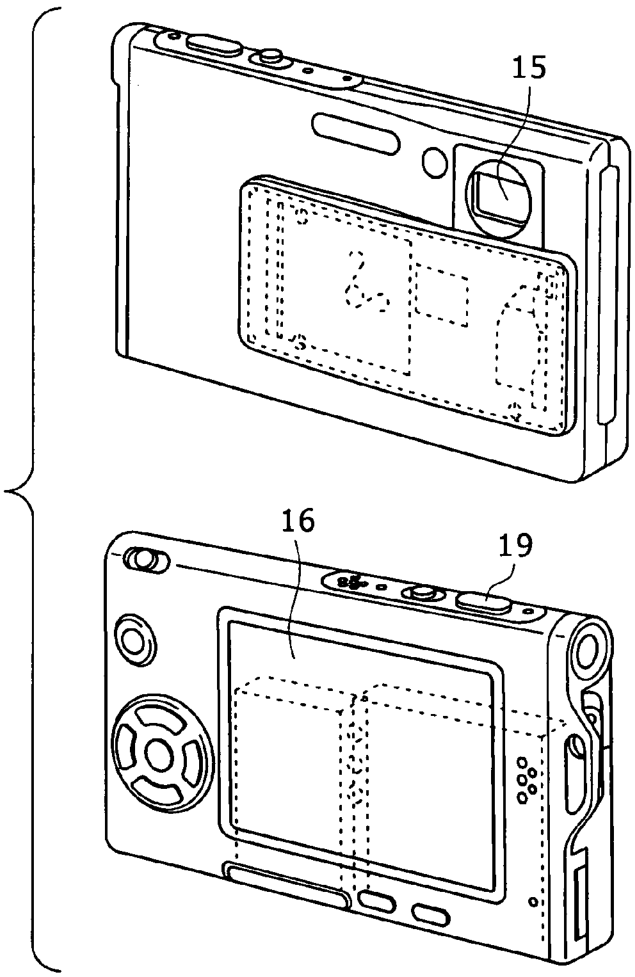
FIG. 18 is a perspective view illustrating a digital still camera having the above-mentioned display apparatus.

FIG. 18 shows a digital camera to which the display apparatus according to the present embodiment is applied. The top shows the front view of the digital camera, while the bottom shows the rear view. This digital camera has a taking lens, a light emitting section 15 for flashing, a display section 16, a control switch, a menu switch, and a shutter 19, for example, and is manufactured by use of the display apparatus according to the present embodiment as the display section 16.

Figure 19:
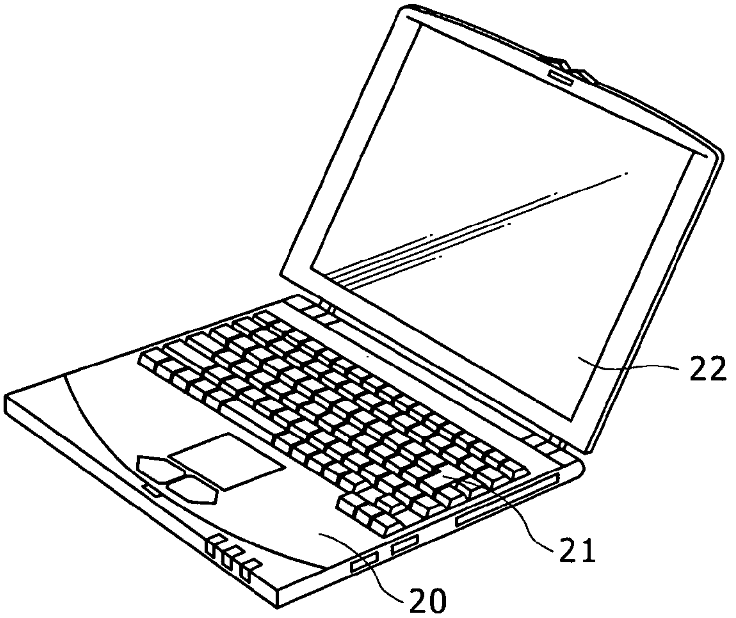
FIG. 19 is a perspective view illustrating a note-type personal computer having the above-mentioned display apparatus.

FIG. 19 shows a laptop personal computer to which the display apparatus according to the present embodiment is applied. A main body 20 has a keyboard 21 through which a user enters characters and so on into this personal computer. A main body cover of this personal computer has a display section 22 for displaying images. This display section 22 is made up of the display apparatus according to the present embodiment.

Figure 20:
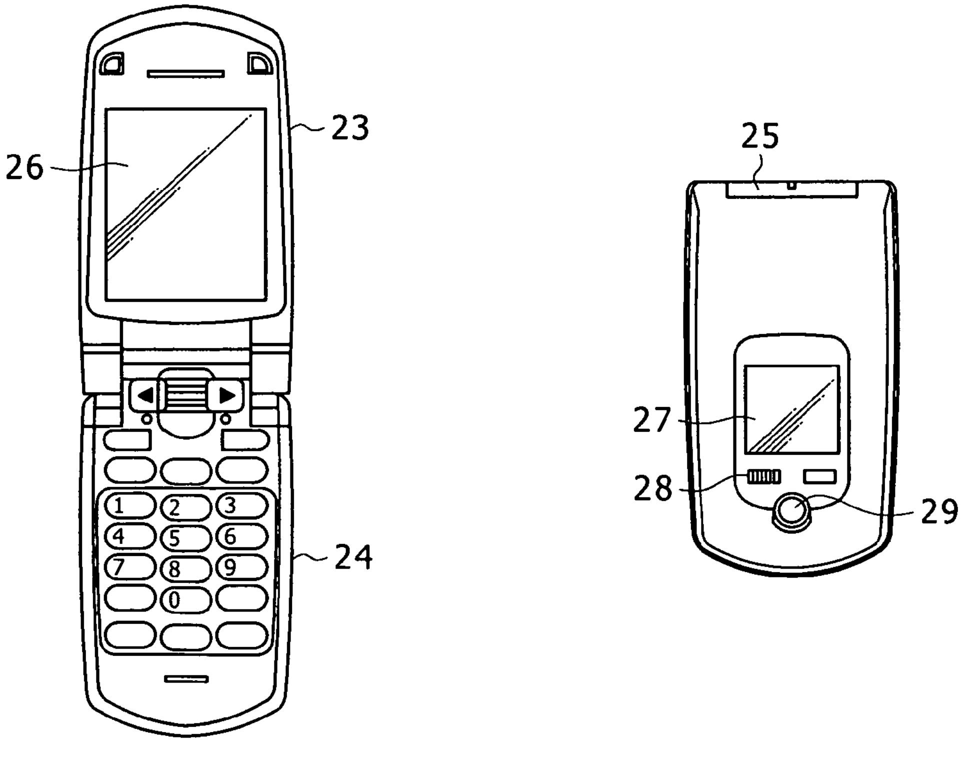
FIG. 20 is a schematic diagram illustrating a portable terminal apparatus having the above-mentioned display apparatus.

FIG. 20 shows a portable terminal device to which the display apparatus according to the present embodiment is applied. Shown to the left is the portable terminal device in an opened state. Shown to the right is the portable terminal device in a closed state. This portable terminal device has an upper housing 23, a lower housing 24, a link section (or hinge) 25, a display 26, a sub display 27, a picture light 28, a camera 29 and so on, for example. This portable terminal device is manufactured by applying the display apparatus according to the present embodiment to the display 26 and the sub display 27.

Figure 21:
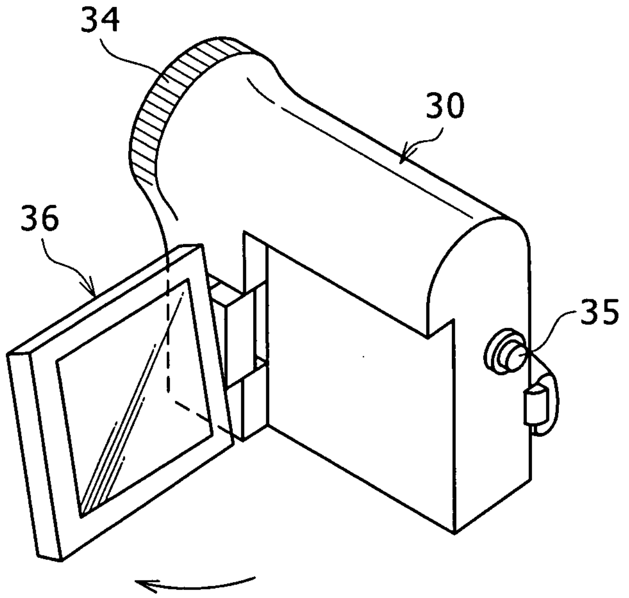
FIG. 21 is a perspective view illustrating a video camera having the above-mentioned display apparatus.

FIG. 21 shows is a video camera to which the display apparatus according to the present embodiment is applied. This video camera has a main body section 30, a taking lens 34 for shooting an image-pickup object facing in front, a start/stop switch 35 for shooting, and a monitor 36, for example. This video camera is manufactured by applying the display apparatus according to the present embodiment to the monitor 36.

While preferred embodiments of the present invention have been described using specific terms, such description is for illustrative purpose only, and it is to be understood that changes and variations may be made without departing from the spirit or scope of the following claims.

What is claimed is:

1. A display apparatus comprising:

a pixel array section and a drive section, said pixel array section having power supply lines, scan lines arranged in rows, signal lines arranged in columns, and pixels arranged in a matrix at intersections of said scan lines and said signal lines, at least one of said pixels comprising a sampling transistor, a drive transistor, a light emitting device, and a capacitor, said sampling transistor being connected at a control terminal to one of said scan lines, at a first current terminal to one of said signal lines, and at a second current terminal to a control terminal of said drive transistor, said drive transistor being connected at a first current terminal to said light emitting device and at a second current terminal to one of said power supply line, said drive section supplying a control signal to one of said scan lines and a video signal to one of said signal lines, and executing a threshold voltage correcting operation for correcting a fluctuation of a threshold voltage of said drive transistor, a write operation for writing said video signal to said capacitor, and a light emitting operation for driving said light emitting device to emit light in accordance with the written video signal, said threshold voltage correcting operation including a preparation portion in which, while the control terminal of said drive transistor is maintained at a reference potential, a gate-to-source voltage with the first current terminal of said drive transistor is set higher than said threshold voltage to turn on said drive transistor and an energizing portion in which said drive transistor is energized with said control terminal maintained at the reference potential to hold, in said capacitor, a voltage equivalent to said threshold voltage appearing between said control terminal and said first terminal of said drive transistor when said drive transistor is cut off, said energizing portion being executed in a time division manner a plurality of times until said drive transistor cuts off, there being a difference between a reference potential to be applied to the control terminal of said drive transistor in a preceding energizing portion and the reference potential to be applied to the control terminal of said drive transistor in a following energizing portion;

wherein a voltage at said source of said drive transistor is brought to an initial voltage and then said voltage rises iteratively during a threshold voltage correction period, a signal potential writing period, a light emitting period and rises continuously throughout the signal potential writing period, and the voltage at said source of said drive transistor at an ending time of the signal potential writing period is lower than 0V.

2. The display apparatus according to claim 1, wherein said energizing portion is executed in a time division manner a plurality of times until said drive transistor cuts off and the reference potential to be applied to the gate of said drive transistor in the following energizing portion becomes higher than the reference potential to be applied to the gate of said drive transistor in the preceding energizing portion.

3. The display apparatus according to claim 2, wherein said drive section has a write scanner for sequentially supplying control signals to scan lines for each horizontal scan period, a power supply scanner for switching each power supply line between high potential and low potential, and a signal driver for supplying a video signal in which a signal potential and a reference potential are switched in each horizontal scan period to each signal line;

in said preparation period, while said write scanner outputs a control signal to turn on said sampling transistor and samples the reference potential from the signal line to apply the sampled reference potential to the gate of said drive transistor, said power supply scanner switches said power supply line from high potential to low potential to lower a potential of the source of said drive transistor to low potential; and in said energizing portion, said power supply scanner switches said power supply line from low potential to high potential to energize said drive transistor until said drive transistor cuts off, wherein said signal driver executes switching control such that the reference potential to be outputted to the signal line in the following energizing portion is higher than the reference potential to be outputted to the signal line in the preceding energizing portion.

4. A driving method for a display apparatus made up of a pixel array section and a drive section, said pixel array section having power supply lines, scan lines arranged in rows, signal lines arranged in columns, and pixels arranged in a matrix at intersections of said scan lines and said signal lines, at least one of said pixels comprising a sampling transistor, a drive transistor, a light emitting device, and a capacitor, said sampling transistor being connected at a control terminal to one of said scan lines, at a first current terminal to one of said signal lines, and at a second current terminal to a control terminal of said drive transistor, said drive transistor being connected at a first current terminal to said light emitting device and at a second current terminal to one of said power supply line, said drive section supplying a control signal to one of said scan lines and a video signal to one of said signal lines, and executing a threshold voltage correcting operation for correcting a fluctuation of a threshold voltage of said drive transistor, a write operation for writing said video signal to said capacitor, and a light emitting operation for driving said light emitting device to emit light in accordance with the written video signal, said driving method comprising:

setting a gate-to-source voltage with the first current terminal of said drive transistor is set higher than said threshold voltage to turn on said drive transistor while the control terminal of said drive transistor is maintained at a reference potential;

energizing said drive transistor with the control terminal maintained at the reference potential to hold, in said capacitor, a voltage equivalent to said threshold voltage appearing between the control terminal and the first current terminal when said drive transistor is cut off;

varying said reference potential applied to said gate to compress said gate-to-source voltage to higher level than the voltage equivalent to said threshold voltage to surely turn off said drive transistor; and allowing a voltage at said source of said drive transistor to drop down to an initial voltage and then to rise iteratively during a threshold voltage correction period, a signal potential writing period, and a light emitting period and to rise continuously throughout the signal potential writing period, the voltage at said source of said drive transistor at an ending time of the signal potential writing period is lower than 0V.

5. A driving method for a display apparatus made up of a pixel array section and a drive section, said pixel array section having power supply lines, scan lines arranged in rows, signal lines arranged in columns, and pixels arranged in a matrix at intersections of said scan lines and said signal lines, at least one of said pixels comprising a sampling transistor, a drive transistor, a light emitting device, and a capacitor, said sampling transistor being connected at a control terminal to one of said scan lines, at a first current terminal to one of said signal lines, and at a second current terminal to a control terminal of said drive transistor, said drive transistor being connected at a first current terminal to said light emitting device and at a second current terminal to one of said power supply line, said drive section supplying a control signal to each scan line and a video signal to each signal line to drive each pixel, executing a threshold voltage correcting operation for correcting a fluctuation of a threshold voltage of said drive transistor, a write operation for writing said video signal to said capacitor, and a light emitting operation for emitting said light emitting device in accordance with the written video signal, said driving method comprising the steps of:

setting a gate-to-source voltage with the current terminal that is a source of said drive transistor is set higher than said threshold voltage to turn on said drive transistor while the control terminal that is a gate of said drive transistor is maintained at a reference potential; and energizing said drive transistor with said gate maintained at the reference potential to hold, in said capacitor, a voltage equivalent to said threshold voltage appearing between said gate and said source when said drive transistor is cut off, said energizing process being executed in a time division manner a plurality of times until said drive transistor cuts off, there being a difference between a reference potential to be applied to the gate of said drive transistor in a preceding energizing process and a reference potential to be applied to the gate of said drive transistor in a following energizing process;

allowing a voltage at said source of said drive transistor to bring to an initial voltage and then said voltage rises iteratively during a threshold voltage correction period, a signal potential writing period, and a light emitting period and rises continuously throughout the signal potential writing period, the voltage at said source of said drive transistor at an ending time of the signal potential writing period is lower than 0V.

6. An electronic device, comprising a display apparatus according to claim 1.

7. A display apparatus comprising:

pixel array means and drive means, said pixel array means having power supply lines, scan lines arranged in rows, signal lines arranged in columns, and pixels arranged in a matrix at intersections of said scan lines and said signal lines, at least one of said pixels comprising a sampling transistor, a drive transistor, a light emitting device, and a capacitor, said sampling transistor being connected at a control terminal to one of said scan lines, at a first current terminal to one of said signal lines, and at a second current terminal to a control terminal of said drive transistor, said drive transistor being connected at a first current terminal to said light emitting device and at a second current terminal to one of said power supply line, said drive means supplying a control signal to each scan line and a video signal to each signal line to drive each pixel, executing a threshold voltage correcting operation for correcting a fluctuation of a threshold voltage of said drive transistor, a write operation for writing said video signal to said capacitor, and a light emitting operation for driving said light emitting device in accordance with the written video signal, said threshold voltage correcting operation including a preparation portion in which, while the control terminal of said drive transistor is maintained at a reference potential, a gate-to-source voltage with the first current terminal of said drive transistor is set higher than said threshold voltage to turn on said drive transistor and an energizing portion in which said drive transistor is energized with said control terminal maintained at the reference potential to hold, in said capacitor, a voltage equivalent to said threshold voltage appearing between said control terminal and said first terminal of said drive transistor when said drive transistor is cut off, and a compression portion in which said reference potential applied to the control terminal is varied to compress said gate-to-source voltage to higher level than the voltage equivalent to said threshold voltage to surely turn off said drive transistor;

wherein a voltage at said source of said drive transistor is brought to an initial voltage and then said voltage rises iteratively during a threshold voltage correction period, a signal potential writing period, and a light emitting period and rises continuously from the signal potential writing period, wherein a gate of said drive transistor is maintained at a first reference potential during said preparation portion and said energizing portion, and wherein said first reference potential applied to said gate is decreased smoothly to a second reference potential in said compression portion during a non-light emission period so that said gate-to-source voltage of said drive transistor is reduced.

8. A display apparatus comprising:

pixel array means and drive means, said pixel array means having power supply lines, scan lines arranged in rows, signal lines arranged in columns, and pixels arranged in a matrix at intersections of said scan lines and said signal lines, at least one of said pixels comprising a sampling transistor, a drive transistor, a light emitting device, and a capacitor, said sampling transistor being connected at a control terminal to one of said scan lines, at a first current terminal to one of said signal lines, and at a second current terminal to a control terminal of said drive transistor, said drive transistor being connected at a first current terminal to said light emitting device and at a second current terminal to one of said power supply line, said drive means supplying a control signal to each scan line and a video signal to each signal line to drive each pixel, executing a threshold voltage correcting operation for correcting a fluctuation of a threshold voltage of said drive transistor, a write operation for writing said video signal to said capacitor, and a light emitting operation for driving said light emitting device in accordance with the written video signal, said threshold voltage correcting operation including a preparation portion in which, while the control terminal of said drive transistor is maintained at a reference potential, a gate-to-source voltage with the first current terminal of said drive transistor is set higher than said threshold voltage to turn on said drive transistor and an energizing portion in which said drive transistor is energized with said control terminal maintained at the reference potential to hold, in said capacitor, a voltage equivalent to said threshold voltage appearing between said control terminal and said first terminal of said drive transistor when said drive transistor is cut off, said energizing portion being executed in a time division manner a plurality of times until said drive transistor cuts off, there being a difference between a reference potential to be applied to the control terminal of said drive transistor in a preceding energizing portion and the reference potential to be applied to the control terminal of said drive transistor in a following energizing portion;

wherein a voltage at said source of said drive transistor is brought to an initial voltage and then said voltage rises iteratively during a threshold voltage correction period, a signal potential writing period, a light emitting period and rises continuously throughout the signal potential writing period, and the voltage at said source of said drive transistor at an ending time of the signal potential writing period is lower than 0V.

9. A display apparatus comprising:

a pixel array section and a drive section, said pixel array section having power supply lines, scan lines arranged in row, signal lines arranged in column, and pixels arranged in matrix, each of said pixels at least having:

a sampling transistor controlled by each of said scan lines and configured to sample a signal from each of said signal lines, a capacitor configured to store voltage based on a data signal from said signal lines, a drive transistor configured to supply an output current in response to said voltage stored in said capacitor, a light emitting device configured to emit light in response to said output current supplied from said drive transistor, said drive section configured to supply at least a control signal to each of said scan lines and said data signal to each of said signal lines to drive each pixel, and configured to execute a threshold voltage correcting operation, said threshold voltage correcting operation including a preparation portion in which, a gate-to-source voltage of said drive transistor is set higher than said threshold voltage of said drive transistor to turn on said drive transistor, an energizing portion in which said drive transistor is energized so that the gate-to-source voltage approaches said threshold voltage, and wherein said gate-to-source voltage of said drive transistor is reduced after said drive transistor is energized;

wherein a voltage at said source of said drive transistor is brought to an initial voltage and then said voltage rises iteratively during a threshold voltage correction period, a signal potential writing period, a light emitting period and rises continuously throughout the signal potential writing period, and the voltage at said source of said drive transistor at an ending time of the signal potential writing period is lower than 0V.

10. The display apparatus according to claim 9, wherein said drive transistor is energized in said energizing portion until said gate-to-source voltage becomes equivalent to said threshold voltage of said drive transistor.

11. The display apparatus according to claim 7, wherein said gate-to-source voltage is reduced to a lower voltage than said threshold voltage of said drive transistor in said compression portion.

12. An electronic device, comprising a display apparatus according to claim 7.

13. An electronic device, comprising a display apparatus according to claim 8.

14. An electronic device, comprising a display apparatus according to claim 9.

* * * * *